US007721971B2

(12) United States Patent
Yano

(10) Patent No.: US 7,721,971 B2
(45) Date of Patent: May 25, 2010

(54) IMAGE PROCESSING SYSTEM, IMAGE PROCESSING METHOD AND COMPUTER READABLE INFORMATION RECORDING MEDIUM

(75) Inventor: Takanori Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1105 days.

(21) Appl. No.: 11/378,982

(22) Filed: Mar. 16, 2006

(65) Prior Publication Data

US 2006/0218295 A1 Sep. 28, 2006

(30) Foreign Application Priority Data

Mar. 16, 2005 (JP) ............................. 2005-075419
Jan. 20, 2006 (JP) ............................. 2006-012169

(51) Int. Cl.
*G06K 19/06* (2006.01)

(52) U.S. Cl. ..................... 235/494; 382/232; 382/233

(58) Field of Classification Search ................. 235/494; 382/232, 233, 235
See application file for complete search history.

(56) References Cited

U.S. PATENT DOCUMENTS 7,298,909 B2 * 11/2007 Ishikawa ..................... 382/232
7,397,958 B2 * 7/2008 Le Leannec et al. ........ 382/233
7,460,724 B2 * 12/2008 Gormish ..................... 382/240
7,502,501 B2 * 3/2009 Joshi .......................... 382/128
2004/0126019 A1 7/2004 Ikebe et al.

FOREIGN PATENT DOCUMENTS

| JP | 05-183757    | 7/1993 |
| JP | 11-205786    | 7/1999 |
| JP | 2003-023544  | 1/2003 |
| JP | 2003-023630  | 1/2003 |
| JP | 2003-169216  | 6/2003 |
| JP | 2003-169333  | 6/2003 |
| JP | 2003-244676  | 8/2003 |
| JP | 2004-040674  | 2/2004 |
| JP | 2004-056648  | 2/2004 |
| JP | 2004-088277  | 3/2004 |
| JP | 2004-088425  | 3/2004 |
| JP | 2004-274758  | 9/2004 |
| JP | 2005-012685  | 1/2005 |

* cited by examiner

*Primary Examiner*—Ahshik Kim
(74) *Attorney, Agent, or Firm*—Blakely, Sokoloff, Taylor & Zafman LLP

(57) ABSTRACT

In an image processing system, in which code data is transmitted between at least one client and a server, the client includes a selecting unit to select a processing function to execute; and a notifying unit to notify the selected processing function to the server. The server includes a selecting unit to select a type of a stream of code data transmitted between the server and the client, based on the notified processing function; and a notifying unit to notify the client of the selected type of stream.

33 Claims, 24 Drawing Sheets

FIG.5
[FOR CASE OF PRINTER OUTPUT]
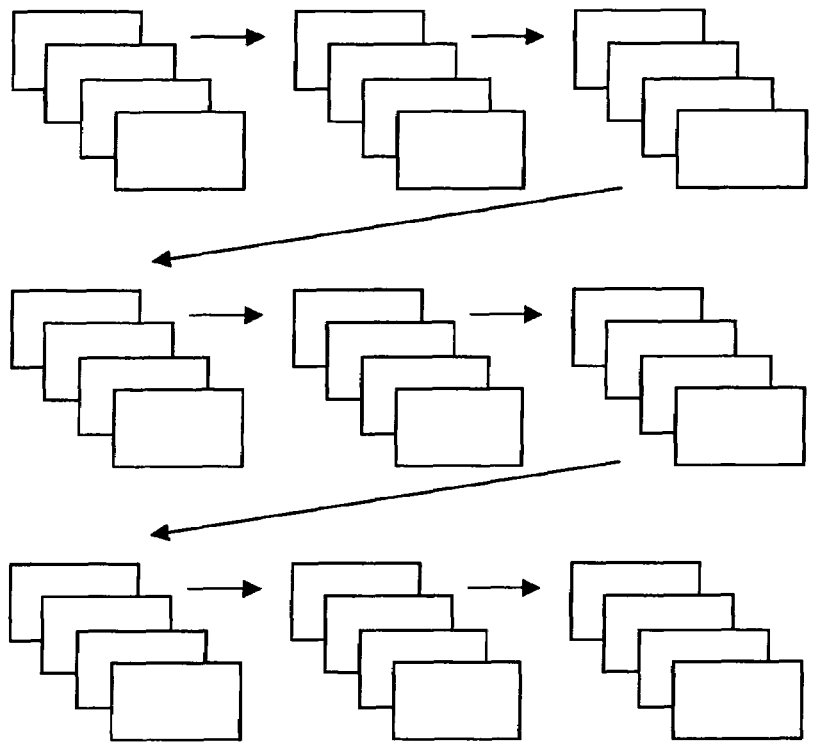
[FOR CASE OF DISPLAY OUTPUT]
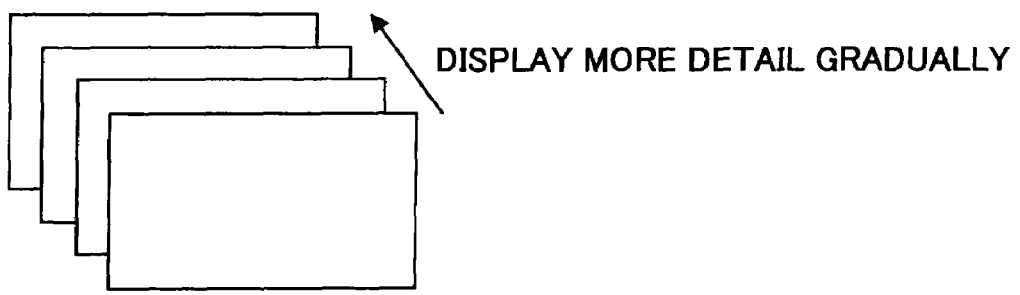
DISPLAY MORE DETAIL GRADUALLY FIG.9
DECOMPOSITION_LEVEL_0
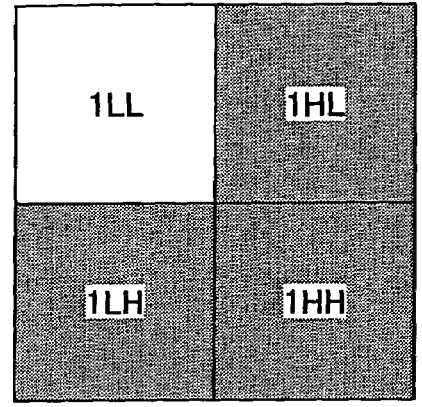
DECOMPOSITION_LEVEL_1
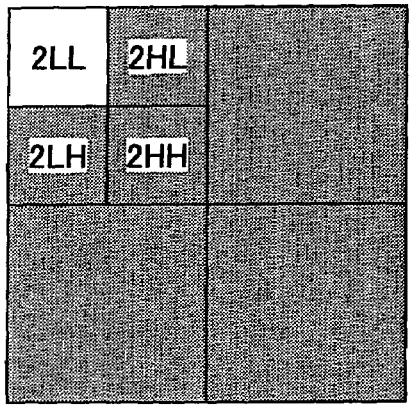
DECOMPOSITION_LEVEL_2
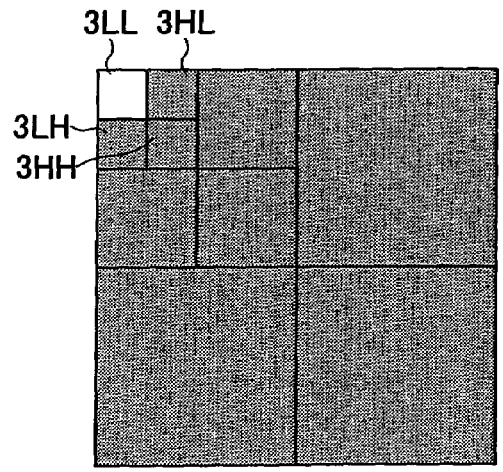
DECOMPOSITION_LEVEL_3

FIG.11

PACKET CONFIGURATION OF JPET2000. ACCORDING TO JAPEG2000, TRUNCATION IS CARRIED OUT IN PACKET UNITS.
IMAGE SIZE: 100 BY 100 PIXELS; TWO LAYERS: RESOLUTION LEVEL: 3 (0-2); THREE COMPONENTS; PRECINCT SIZE: 32 BY 32.
SEQUENCE (ORDER OF INTERPRETATION OF PACKETS) OF 36 PACKETS FOR CASE OF LRCP PROGRESSION:

LRCP

| PACKET 0 | PACKET 1 | PACKET 2 | PACKET 3 | PACKET 4 | PACKET 5 |
|---|---|---|---|---|---|
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 12 | PACKET 13 | PACKET 14 | PACKET 15 | PACKET 16 | PACKET 17 |
|---|---|---|---|---|---|
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 18 | PACKET 19 | PACKET 20 | PACKET 21 | PACKET 22 | PACKET 23 |
|---|---|---|---|---|---|
| LAYER 1 | LAYER 1 | LAYER 1 | LAYER 1 | LAYER 1 | LAYER 1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 24 | PACKET 25 | PACKET 26 | PACKET 27 | PACKET 28 | PACKET 29 |
|---|---|---|---|---|---|
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.12

IMAGE SIZE: 100 BY 100 PIXELS; ONE LAYER: RESOLUTION LEVEL: 3; THREE COMPONENTS; PRECINCT SIZE: 32 BY 32.
SEQUENCE (ORDER OF INTERPRETATION OF PACKETS) OF 18 PACKETS FOR CASE OF LRCP PROGRESSION:

LRCP

| PACKET 0 | PACKET 1 | PACKET 2 | PACKET 3 | PACKET 4 | PACKET 5 |
|---|---|---|---|---|---|
| LAYER 0 RESOLUTION LEVEL 0 COMPONENT 0 PRECINCT 0 | LAYER 0 RESOLUTION LEVEL 0 COMPONENT 1 PRECINCT 0 | LAYER 0 RESOLUTION LEVEL 0 COMPONENT 2 PRECINCT 0 | LAYER 0 RESOLUTION LEVEL 1 COMPONENT 0 PRECINCT 0 | LAYER 0 RESOLUTION LEVEL 1 COMPONENT 1 PRECINCT 0 | LAYER 0 RESOLUTION LEVEL 1 COMPONENT 2 PRECINCT 0 |

| PACKET 6 | PACKET 7 | PACKET 8 | PACKET 9 | PACKET 10 | PACKET 11 |
|---|---|---|---|---|---|
| LAYER 0 RESOLUTION LEVEL 2 COMPONENT 0 PRECINCT 0 | LAYER 0 RESOLUTION LEVEL 2 COMPONENT 0 PRECINCT 1 | LAYER 0 RESOLUTION LEVEL 2 COMPONENT 0 PRECINCT 2 | LAYER 0 RESOLUTION LEVEL 2 COMPONENT 0 PRECINCT 3 | LAYER 0 RESOLUTION LEVEL 2 COMPONENT 1 PRECINCT 0 | LAYER 0 RESOLUTION LEVEL 2 COMPONENT 1 PRECINCT 1 |

| PACKET 12 | PACKET 13 | PACKET 14 | PACKET 15 | PACKET 16 | PACKET 17 |
|---|---|---|---|---|---|
| LAYER 0 RESOLUTION LEVEL 2 COMPONENT 1 PRECINCT 2 | LAYER 0 RESOLUTION LEVEL 2 COMPONENT 1 PRECINCT 3 | LAYER 0 RESOLUTION LEVEL 2 COMPONENT 2 PRECINCT 0 | LAYER 0 RESOLUTION LEVEL 2 COMPONENT 2 PRECINCT 1 | LAYER 0 RESOLUTION LEVEL 2 COMPONENT 2 PRECINCT 2 | LAYER 0 RESOLUTION LEVEL 2 COMPONENT 2 PRECINCT 3 |

| PACKET 18 | PACKET 19 | PACKET 20 | PACKET 21 | PACKET 22 | PACKET 23 |
|---|---|---|---|---|---|
| LAYER 1 RESOLUTION LEVEL 0 COMPONENT 0 PRECINCT 0 | LAYER 1 RESOLUTION LEVEL 0 COMPONENT 1 PRECINCT 0 | LAYER 1 RESOLUTION LEVEL 0 COMPONENT 2 PRECINCT 0 | LAYER 1 RESOLUTION LEVEL 1 COMPONENT 0 PRECINCT 0 | LAYER 1 RESOLUTION LEVEL 1 COMPONENT 1 PRECINCT 0 | LAYER 1 RESOLUTION LEVEL 1 COMPONENT 2 PRECINCT 0 |

| PACKET 24 | PACKET 25 | PACKET 26 | PACKET 27 | PACKET 28 | PACKET 29 |
|---|---|---|---|---|---|
| LAYER 1 RESOLUTION LEVEL 2 COMPONENT 0 PRECINCT 0 | LAYER 1 RESOLUTION LEVEL 2 COMPONENT 0 PRECINCT 1 | LAYER 1 RESOLUTION LEVEL 2 COMPONENT 0 PRECINCT 2 | LAYER 1 RESOLUTION LEVEL 2 COMPONENT 0 PRECINCT 3 | LAYER 1 RESOLUTION LEVEL 2 COMPONENT 1 PRECINCT 0 | LAYER 1 RESOLUTION LEVEL 2 COMPONENT 1 PRECINCT 1 |

| PACKET 30 | PACKET 31 | PACKET 32 | PACKET 33 | PACKET 34 | PACKET 35 |
|---|---|---|---|---|---|
| LAYER 1 RESOLUTION LEVEL 2 COMPONENT 1 PRECINCT 2 | LAYER 1 RESOLUTION LEVEL 2 COMPONENT 1 PRECINCT 3 | LAYER 1 RESOLUTION LEVEL 2 COMPONENT 2 PRECINCT 1 | LAYER 1 RESOLUTION LEVEL 2 COMPONENT 2 PRECINCT 2 | LAYER 1 RESOLUTION LEVEL 2 COMPONENT 2 PRECINCT 3 | LAYER 1 RESOLUTION LEVEL 2 COMPONENT 2 PRECINCT 4 |

FIG.13

IMAGE SIZE: 100 BY 100 PIXELS; TWO LAYERS: RESOLUTION LEVEL: 2 (0-1); THREE COMPONENTS; PRECINCT SIZE: 32 BY 32.
SEQUENCE (ORDER OF INTERPRETATION OF PACKETS) OF 12 PACKETS FOR CASE OF LRCP PROGRESSION:

LRCP

| PACKET 0 | PACKET 1 | PACKET 2 | PACKET 3 | PACKET 4 | PACKET 5 |
|---|---|---|---|---|---|
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 0 | COMPONENT 0 | COMPONENT 0 | COMPONENT 0 | COMPONENT 0 |
| PRECINCT 0 | PRECINCT 1 | PRECINCT 2 | PRECINCT 0 | PRECINCT 1 | PRECINCT 2 |

FIG.14

B COMPONENT

| B00 | B01 | B02 | B03 |
|-----|-----|-----|-----|
| B04 | B05 | B06 | |
| B08 | B09 | B10 | |
| B12 | B13 | B14 | |

TILE

G COMPONENT

| G00 | G01 | G02 | G03 |
|-----|-----|-----|-----|
| G04 | G05 | G06 | |
| G08 | G09 | G10 | |
| G12 | G13 | G14 | |

R COMPONENT

| R00 | R01 | R02 | R03 |
|-----|-----|-----|-----|
| R04 | R05 | R06 | R07 |
| R08 | R09 | R10 | R11 |
| R12 | R13 | R14 | R15 |

TIME

TIME

IMAGE PROCESSING SYSTEM, IMAGE PROCESSING METHOD AND COMPUTER READABLE INFORMATION RECORDING MEDIUM

The present application claims priority to and incorporates by reference the entire contents of Japanese priority document 2005-075419, filed in Japan on Mar. 16, 2005 and 2006-012169, filed in Japan on Jan. 20, 2006.

BACKGROUND OF THE INVENTION

1. Field of the Invention

The present invention relates to an image processing system, an image processing method and a computer readable information recording medium, and, in particular, to progression order code data decoding processing.

2. The Description the Related Art

Along with a spread of the Internet, information is disclosed in a homepage established in a WWW server (referred to as a web server, hereinafter), and a general user can search and obtain variable sorts of information therefrom. In such a system in which the web server discloses information on the Internet and clients view the information, the information disclosed by the web server can be viewed with the use of a web browser from the client.

In the web server, documents described with a HTML source are stored for establishing the home page. As a result of the client's web browser accessing it, the information is displayed on a display device of the client.

Further, the web browser of the client can obtain required information by use of a link included in the homepage displayed.

Further, as a protocol for fragmentarily accessing an image managed by the server, and displaying it on the client, IIP (Internet Imaging Protocol) exists. The IIP is an optimum protocol for an image data file format called FlashPix, and enables requesting a part of image data through the network.

As a transfer protocol for transferring a compressed image between the server and client, JPIP (JPEG2000 Interactive Protocol) for JPEG2000 compressed images exists. The JPIP is a protocol for fragmentarily accessing a JPEG2000 file and displaying it.

By using JPIP and JPEG2000, accessing a partial area of an image and selecting a resolution is made possible. Further, a change in image quality, switching between color and monochrome and setting of response data limiting a size can be easily made according to the client's request.

When, by using JPIP, JPEG2000 image data is fragmentarily transmitted, received fragmental code data should be cached in the client for the purpose of decoding the image data in the client. This is because, each scalability code data of JPEG2000 is different from scalability data lower by one level. According to JPIP, as a stream type for transmitting code data, two types, i.e., JPP-stream and JPT-stream exist.

The JPP-stream means a way in which precinct divided code is transmitted according to an order of a code stream. As shown in FIG. 24, in this way, the entire image is displayed from the beginning, and the image quality of the entire image improves as time elapses. In this case, at the beginning, although the image quality is low, a general view of the image can be recognized. Accordingly, this way is suitable for the purpose that the image quality of the entire image improves earlier, and the contents can be recognized earlier.

The JPT stream means a way in which tile divided code is transmitted in an order of the code stream. As shown in FIG. 25, tile images of top left are displayed first, then top right tile images are displayed, bottom left tile images and then, bottom right tile images are displayed. Thus, the entire image is finally displayed. In this case, decompression processing is performed in tile units. Accordingly, a memory amount required can be reduced since a common memory can be used for each tile decompression processing. Further, since each code data is transmitted successively in tile units, transmission efficiency is higher. This way is suitable for the purpose of printing, storing, or updating image data from a client to a server.

Related Arts of Code Data is Described Now.

(1) Code Data Progressive Control:

Japanese Laid-open Patent Application No. 2003-23544 discloses coding with switching a tile progressive order according to the tile's image attribute.

Japanese Laid-open Patent Application No. 2004-40674 discloses progressive display in which a resolution level of JPEG2000 code data is increased in sequence from an image resolution level currently displayed, at high speed.

(2) Code Data Access Control:

Japanese Laid-open Patent Application No. 11-205786 discloses FlashPix, which is a multiple resolution expression, and IIP, which is a protocol for accessing it.

Japanese Laid-open Patent Application No. 2003-23630 discloses that, in JPIP, a client has a cache, and requests a server for transmitting code not yet cached.

Japanese Laid-open Patent Application No. 2004-274758 discloses transforming JPIP precinct stream (JPP-stream) into a JPEG2000 stream.

(3) JPEG2000 Code Sequence Control:

Japanese Laid-open Patent Application No. 2003-169333 discloses a code sequence producing apparatus producing a new code sequence by use of deletion or sorting of a code sequence, and has a relation to a code sequence editing processing in JPEG2000 described later for embodiments of the present invention.

(4) Progression Order Change:

Generally speaking, to change a code data progression order and perform decoding reproduction of code data on the side of a client, a server selects packets corresponding to respective progressives from among a plurality of packets included in code data, sorts the selected packets according to the respective progressive orders, and re-transmits the code data of packet group corresponding to each progressive. Accordingly, time is required for re-transmission, and, thus, this way is not suitable for real-time processing.

In particular, when a plurality of receiving terminals designate progression orders for common code data on a server, and generate code data, complicated processing is required such that transmission is made for the plurality of receiving terminals. To perform this processing in a real-time manner is difficult.

On the other hand, when lossless code data is transmitted, a client can freely edit code data, change a progressive order and perform decoding reproduction. However, since a code amount increases, a transfer load increases, in this case.

Japanese Laid-open Patent Application No. 2003-244676 discloses that for a plurality for users who designate different quality images, and corresponding images of qualities having different progressive orders can be dispatched simultaneously.

Japanese Laid-open Patent Application No. 2003-169216 discloses that when a client transforms to a progression order suitable for a display requirement, ZLP is applied to code data, not stored in a memory, and JPEG2000 code data is generated.

(5) Editing on Code Level of Code Data Conforming to JPEG2000 Standard:

Japanese Laid-open Patent Applications Nos. 2003-16933 and 2004-088425 disclosed JPEG2000 code data or frame editing technology.

According to JPEG2000, code data having a multi-layer configuration can be produced. A layer corresponds to an image quality and a reproduction image quality can be selected as a result of the layer being selected. For example, when code data is made of three layers, a layer 1 is reproduced for the purpose of obtaining an image of an image quality 1, which is a lowest image quality. Layers 1 and 2 are reproduced for an image quality 2. Layers 1, 2 and 3 are reproduced for a best image quality image.

By using code data having a multi-layer structure, a coding part can easily select a layer of code data before decoding it.

However, Following Problems may Occur:

(1) Progressive Order According to Output Type Information:

In decoding for printer output, upon performing printing processing in sequence, code data should be preferably completely decoded part by part (in a raster order). When decoding is incomplete, even for a part, printing cannot be performed. Further, when printing output is performed, a memory capacity can be reduced and processing can be performed at high efficiency when data is received in the raster order and processing is performed thereon.

On the other hand, in decoding for a display purpose, it is preferable that decoding is made gradually throughout the entirety of a display area, and thus, the entire image concept can be recognized at an earlier stage.

Thus, when output is made for a display purpose, when progressive decoding for each area is applied instead of progressive decoding for each layer or for each resolution, the entire image concept cannot be known at an earlier stage.

(2) Code Data Access Based on Output Type Information:

In JPIP, in response to a request of a client, a server returns code data having a form of a complete image file, tile part stream (JPT-stream), or precinct stream (JPP-stream).

The JPT-stream is the way in which sub-image code data is returned as a set of tile parts defined by JPEG2000 part 1 standard. The JPP-stream is a way in which sub-image code data is returned as a set of precincts defined by JPEG2000 part 1 standard.

When code data, accessed by the JPT-stream manner in sequence is reproduced, complete decoding is performed in sequence for each tile obtained from tile dividing. When code data, accessed by the JPP-stream manner in sequence is reproduced, decoding can be performed gradually of each small area (precinct) unit for a wide zone including a plurality of tiles. That is, in reproduction in access of JPT-stream, an area which is reproduced at once is limited to a tile area of the image entirety. In contrast thereto, in JPP-stream access reproduction, reproduction at once on the image entirety, not limited to a tile area, is made possible.

Therefore, for printer output for which rater order sequential complete decoding is preferred, complete image data is accessed for each part (tile) in JPT-stream, and is reproduced. On the other hand, for display output for which decoding gradually throughout the entire display area is preferred, code data is accessed in fine units gradually throughout the image area entirety in JPP-stream. Even when display is made for each part, code data should be preferably accessed in JPP-stream within the area.

(3) Progressive Decoding:

When an image is displayed in layer progressive, a user can view in such a manner that a contour gradually becomes clearer. When this is applied to a document including characters, photographs and so forth in a mixed manner, the photographs cannot be recognized until reproduction is made approximately completely since a medium tone cannot be seen from a beginning stage. On the other hand, the characters can be recognized before reproduction is made completely since the characters have sharp edges.

Further, when an image is displayed in resolution progressive in which resolution increases gradually, a user can view in such a manner that a defocused state changes into a focused state gradually. When it is applied to a document in which characters and photographs are mixed, general contents of the photographs can be recognized before complete reproduction. However, the characters cannot be recognized until almost complete reproduction is made.

(4) Change in Progression Order After Code Data Production:

When a Motion JPEG2000 motion picture display system is applied, that is, when Motion JPEG2000 is based on, and motion picture data is dispatched to a plurality of clients (receiving terminals) from a single server, processing contents for a single hierarchical file data (code data) differs according to a quality (progressive) designated by the client (receiving terminal).

For example, a case may be assumed where, for a server, a first client (receiving terminal) designates space resolution progressive while a second client designates image quality progressive. In such a case, the server bears a large load for meeting the requirements from all the clients, and real-time processing may not be achieved.

This is because, in a motion picture dispatch system, only one type of quality is allocated for one frame, and the server should prepare different types of qualities for the respective ones of the plurality of receiving terminals.

(5) Re-Transfer of Packets Required Due to Change in Progressive Order:

Packets should be re-transferred when progression order is changed by a client.

According to JPEG2000, a plurality of progressive order code sequence configurations can be selected. Thus, even after producing code data, a client can edit the code data transmitted by a server, exchange progressive orders, or delete not required code sequences.

For example, when the client changes resolution level and outputs when the code data transmitted from the server is not one configured in resolution progressive, the client re-configures for a required code sequence after production of code data on code level, produces code data and reproduces it. This is a case where, after decoding reproduction is performed up to a layer of layer progressive code data, code data is re-configured after resolution is changed, and decoding reproduction is performed.

In this case, when code data is produced in which partial level code sequence is deleted from code data based on progression order, a required code sequence may be lost after the progression order is changed.

In such a case, a reproduced image quality may include a problem. The problem is solved as a result of the required packets being re-transferred. However, real-time processing cannot be achieved. In particular, for a case where real-time processing is performed for streaming type motion data, a serious problem may occur.

(6) Achieving Both Frequency Visual Characteristics and Resolution Visual Characteristics:

According to JPEG2000, layer progressive suitable mainly for frequency visual characteristics level and resolution progressive mainly for resolution visual characteristics level are prepared. Ordinarily, one is selected, and code data configured by code sequences guaranteeing a permissible level is generated. For example, when the resolution progressive is selected, code data configured by code sequences in a certain resolution is generated. However, the code data does not guarantee both the frequency visual characteristics and the resolution visual characteristics.

SUMMARY OF THE INVENTION

An image processing system, image processing method and computer readable information recording medium are described. In one embodiment, an image processing system in which code data is transmitted between at least one client and a server is described, wherein the client comprises a selecting unit to select a processing function to execute and a notifying unit to notify of the selected processing function to the server; and the server comprises a selecting unit to select a type of a stream of code data transmitted between the server and the client, based on the notified processing function, and a notifying unit to notify of the selected type of stream to the client.

BRIEF DESCRIPTION OF THE DRAWINGS

Other embodiments and further features of the present invention will become more apparent from the following detailed description when read in conjunction with the accompanying drawings:

FIG. 5 illustrates a processing order of a case of printer output and display output;

FIG. 9 illustrates decomposition level and subband;

FIGS. 11, 12 and 13 illustrate JPEG2000 packets:

FIG. 14 illustrates base of tile dividing;

DETAILED DESCRIPTION OF THE PREFERRED EMBODIMENTS

Figure 1:
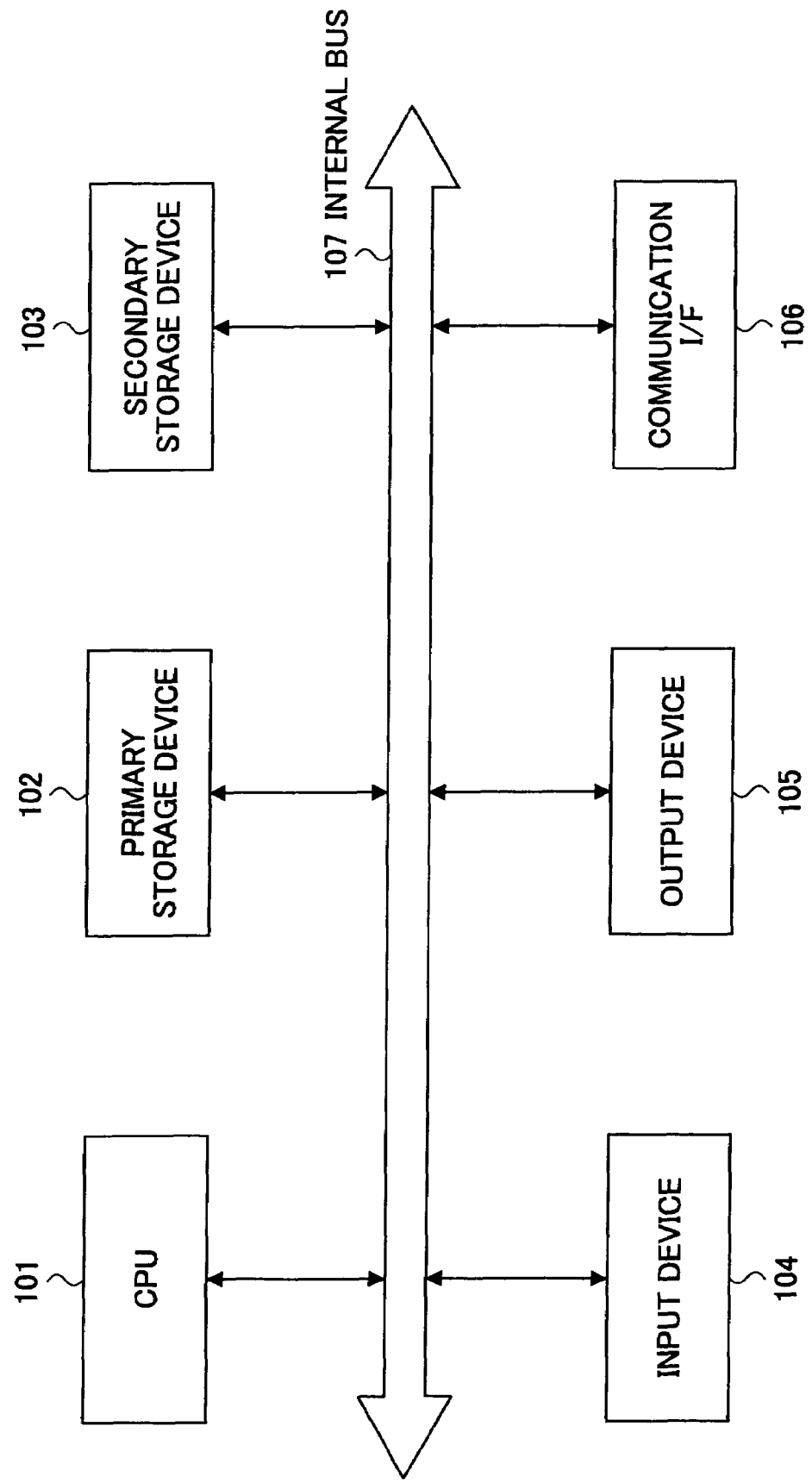
FIG. 1 shows a block diagram of a general configuration of a computer apparatus as an image processing apparatus in one embodiment of the present invention.

The present invention has been devised in consideration of the above-mentioned problems, and an embodiment of the present invention is to change a code data access method or a progressive decoding method adaptively according to characteristics of output device/apparatus such as a printer output or display output, and also, to control the code data access method or the progressive order so as to achieve efficient and effective output.

Another embodiment of the present invention changes a progression order without a need of re-loading a unit of packets from a server even when a client changes a progression order of code data and carries out re-editing or decoding. In this case, when code data received from the server is used, and code data in which progression order is changed after the code data is produced is decoded and an image is output, a required image quality should be ensured. For example, when code data received in the client is used, progression order is changed into resolution progressive (for example, for matching printer resolution), code data is thus produced, and then, decoding reproduction is performed, and decoding reproduction image quality should be ensured.

According to one embodiment of the present invention, an image processing system, in which code data is transmitted between at least one client and a server, the client includes: a selecting unit to select a processing function to execute; and a notifying unit to notify the selected processing function to the server; and the server includes: a selecting unit to select a type of a stream of code data transmitted between the server and the client, based on the notified processing function; and a notifying unit to notify the selected type of stream to the client.

According to another aspect of the present invention, an image processing system, in which code data is transmitted between at least one client and a server, the client includes: a selecting unit to select a processing function to execute; and a notifying unit to notify the server of the selected processing function, and a type of stream for when it is transmitted between the client and the server; and the server includes: a selecting unit to determine, based on the notified processing function, whether or not a type of stream specified by the client should be changed, and, selecting the notified type of stream when determining that change is not required, but selecting another type of stream based on the notified processing function when determining that change is required; and a notifying unit notifying the client of the selected type of stream.

According to one embodiment of the present invention, a code data access method or a progression order are controlled, and thus, efficient and effective output can be achieved.

Further an access unit (coding) is controlled based on output type information identifying whether display output for a display device or printing output for a printing apparatus, and suitable code data access is made possible according to the output type.

Further, by providing a function of controlling progressive order based on the output type information, suitable progressive order selection is made possible according to the output type. For printer output, printing cannot be performed when image data is not completely decoded, even for printing partially. Accordingly, in decoding for printing, code data is completely decoded part by part in sequence (raster sequence) upon performing printing processing in sequence. In printer output, processing is progressed with, upon receiving data in the rater order. Accordingly, a memory can be saved, and efficient processing is achieved.

Further, since progressive decoding for each area is performed for printing output, a memory can be saved, and efficient processing is achieved.

The printer image output order is image production order when image is output to the printer. Generally speaking, from left to right (in main scan direction), from top to bottom (in sub-scan direction), image output is performed in the rater sequence. When output is made to the printer, data of required image area is positively decoded in advance, and thus, efficient image output is achieved.

Upon displaying, progressive decoding is performed for each layer (hierarchy), and thus a general view of the entire image can be known at an earlier stage.

Further, as progressive decoding is performed for each layer (hierarchy) including a display area, a general view of the entire image in the display area can be known at an earlier stage.

Further, by providing a function of controlling progressive order based on output type information and original type information, control can be made such that important image attribute can be known at an earlier stage, upon displaying, with the use of the original type information indicating that an original includes characters, pictures, or such.

Further, when displaying, a function of performing resolution progressive decoding is provided for an original picture, and thus, resolution progressive decoding is performed for an original picture not including characters or line drawings. As a result, the middle tone can be viewed from a beginning, and thus, a display reproduction can be achieved in such a manner that, a focus state gradually occurs from a defocused state.

Further, as a function of layer progressive decoding is provided for a case of an original including characters or line drawing for a display purpose, a display reproduction can be achieved in which user can see a contour gradually clearer from an earlier stage.

Further, by applying coding based on JPEG2000 (ISO/IEC 15444-1) standard, code is a hierarchical code, and coding control for each hierarchy level on code level can be easily achieved.

Further, by providing a function of accessing in area units when an access unit selection is made in a printer, access is made for code data units corresponding to an actual image area for a case of a printer output, and thus, efficient saving memory printing processing can be made possible.

Further, a function is provided of accessing in layer units for a case where access unit selection is made in display. Thereby, when display output is made, access is made in precinct unit. Thereby, code data can be accessed in hierarchy units, and thus, a general view of the entire image can be known at an earlier stage.

Further, by providing a function that an area unit is set in precinct units or tile units according to JPEG2000 standard, code data can be easily accessed in area unit in coding based on JPEG2000 standard.

Further, according to one embodiment of the present invention, although for lossy code data from which code sequences are partially deleted, the part of the code data should not be re-transmitted, and designated plurality of progressions of code data can be generated (by a server). Accordingly, even when progression is changed, loss of code sequences does not occur.

Further, in a client, a code sequence which is not used for a certain progression order code data reproduction is stored, and code data without losing code sequences is re-configured upon change in progression. Thereby, when progression is changed, re-decoding and reproduction can be properly achieved.

Further, since code data in which different progressions are set for respective areas can be generated, an image in which different progressions are set for respective areas can be reproduced. Further, code data suitable for motion picture is reproduced, and, without requiring re-transmission of part of code data, a client can change progression of code data in a real-time manner.

Further, in coding based on JPEG2000 standard, editing of code data on code level can be easily performed, since a plurality of progression orders are prepared.

Below, preferable embodiments are described with reference to figures.

FIG. 1 shows a block diagram of a computer apparatus as an image processing apparatus according to an embodiment of the present invention. In the figure, a CPU 101 executes a program stored in a primary storage device 102, and controls operation of the entirety of this computer apparatus. As the primary storage device (simply referred to as primary storage, hereinafter) 102, a memory is assumed. In the primary storage, a program or such stored in a secondary storage device (simply referred to as a secondary storage) 103 is read out and stored. As the secondary storage 103, a hard disk drive or such is used.

Generally speaking, a data capacity storable in the primary storage 102 is smaller than that of the secondary storage 103. Programs, data and so forth, which cannot be stored in the primary storage is stored in the secondary storage 103. Further, data which should be stored for a long period is also stored in the secondary storable 103. In the present embodiment, software programs describing operation control processing of this computer apparatus are stored in the secondary storage 103. These programs are read in the primary storage 102 before they are executed by the CPU 101.

An input device 104 includes an auxiliary input device such as a mouse, and an input device such as a keyboard. They are used to set a user's operation in the computer. An output device 105 includes, for example, a monitor, a printer and so forth. A communication I/F 106 includes a communication interface enabling bidirectional communication with an eternal apparatus.

The above-mentioned respective parts are connected to an internal bus 107 in such a manner that mutual data transfer is allowed. Therewith, operation control by the CPU 101 on the entire computer apparatus is allowed.

Other various forms are considerable as a specific configuration of the computer apparatus as the image processing apparatus according to the embodiment of the present invention. Currently, a common computer apparatus and peripherals thereof are usable, and details therefor are omitted.

Figure 2:
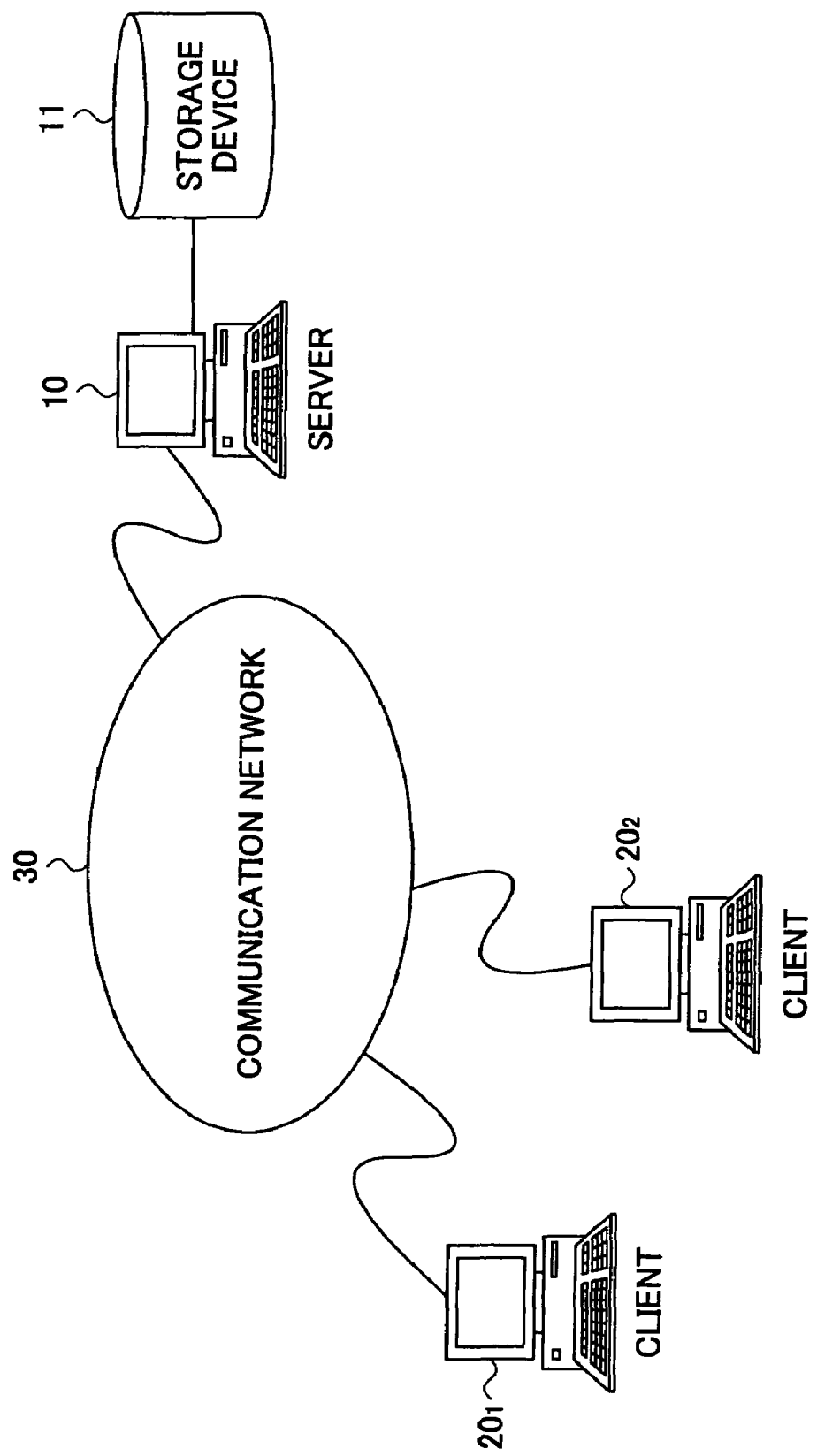
FIG. 2 shows a general configuration of a communication network in the embodiment of the present invention.

FIG. 2 shows a general view of a communication network in the embodiment of the present invention, which shows a server-and-client environment. In the figure, $20_1$ and $20_2$ denote user terminals as clients. Each particular user terminal is, a computer apparatus (computer system) as an image processing apparatus described above with reference to FIG. 1. The clients $20_1$, $20_2$ and a server 10 can perform data communication mutually via a common communication network (simply referred to as a network, hereinafter) 30 such as the Internet. The server computer (simply referred to as a server, hereinafter) 10 has a large-capacity storage device 11 such as a hard disk drive storing image files.

In the present embodiment, the storage device 11 stores a large amount of image data previously coded according to JPEG2000 system. Accordingly, the client $20_1$ or $20_2$ requires desired code data of images from the storage device 11. Processing of the server 10 transmitting the image code data, required by the client, to the client, is described below.

In order to download an image from the storage device 11, the client should use a web browser to access the server 10. The server 10 receives this access, and provides to the user terminal as the client a part or all of the image from the storage device 11, in a form of a thumbnail. Thereby, it is displayed by the web browser.

From among images thus displayed on the web browser, a user selects a desired one with the user of the mouse, keyboard or such. As a result, the user terminal transmits a request for a fragmental of the desired image data to the server 10 according to an image size, a resolution or such, according to requirements. The server 10 responds thereto, and transmits the fragmental data according to the request. The client receives it with the use of a JPIP system, and caches it in a buffer. In order to display the received image, a bit stream is produced according to syntax of JPEG2000 from the cached data, and then, this bit stream is decoded and thus, is displayed.

An embodiment 1 of the present invention is described now.

Figure 3:
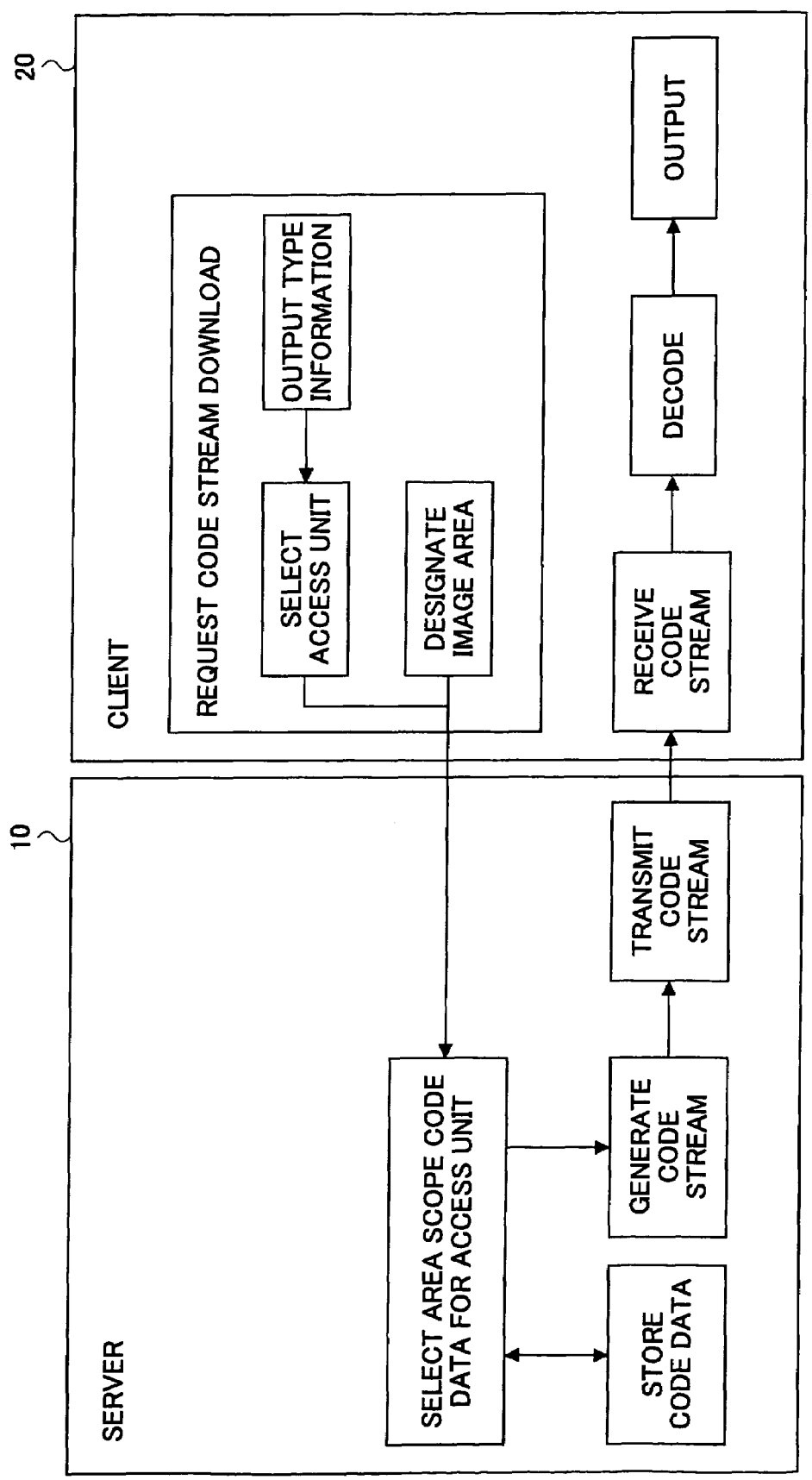
FIG. 3 illustrates a configuration of a first embodiment.

FIG. 3 illustrates the embodiment 1.

An image processing apparatus according to the first embodiment includes a server 10 holding code data and a client 20 decoding and outputting the code data, which are coupled together via a network.

The client 20 transmits an access (reading) request for specific code data from the server 10, receiving a transmitted code stream from the server 10, decodes it and outputs it.

The server 10 receives the download request for the code stream from the client 20, selects area scope code data in access units, generates the code stream, and transmits the same.

In the embodiment 1, a code data access function is provided for accessing code data in a plurality of types of access (reading) units, and selects one type thereof according to given output type information.

As the code data access units, a type for accessing code data for image area units, and a type of accessing code data for hierarchy units of hierarchy code data, are prepared, for example. When accessing code data in image area units, access may be made for code data belonging to different image areas.

The output type information indicates whether display output is made to a display device or printer output is made to a printer or such. According to the output type, suitable code data access is made possible.

An embodiment 2 is described next.

Figure 4:
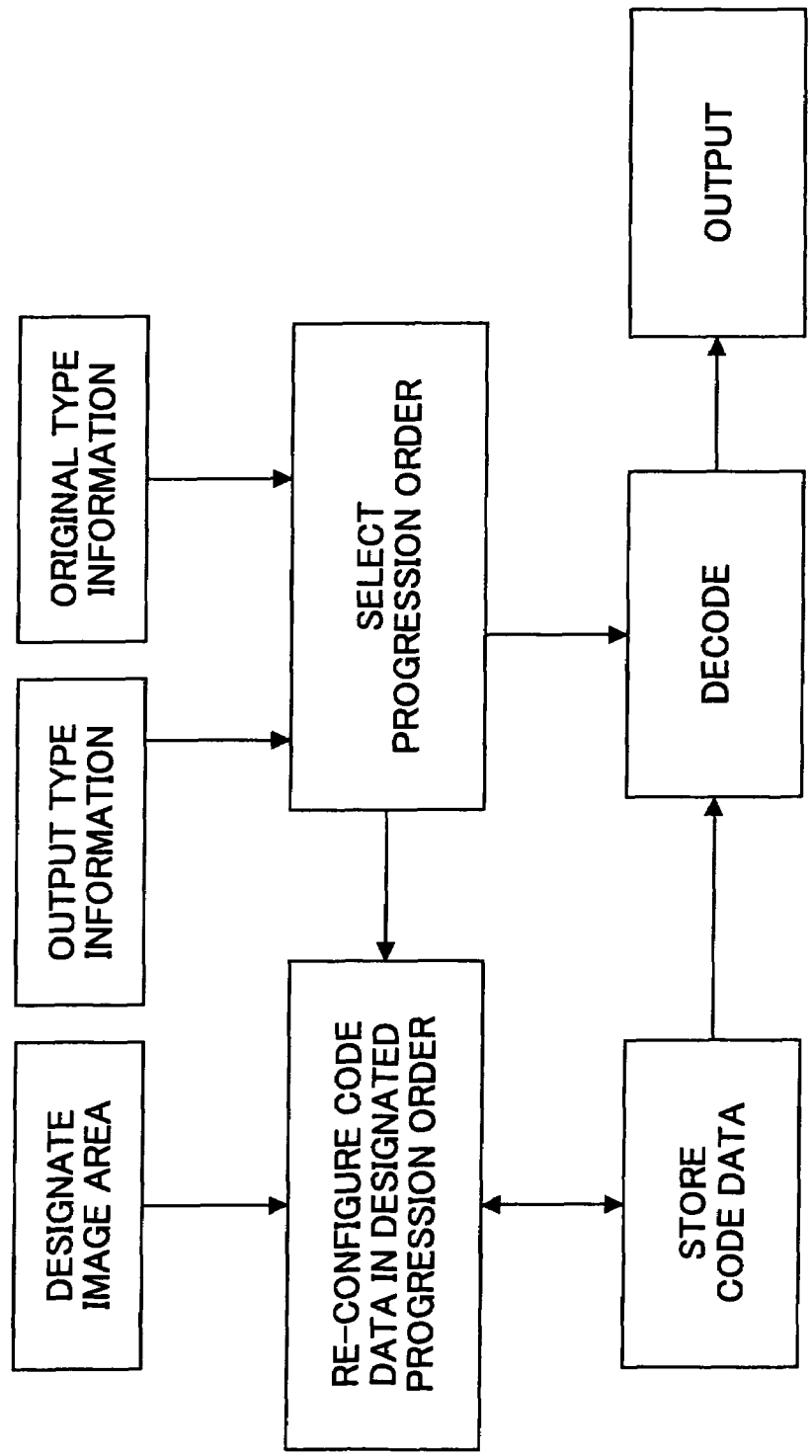
FIG. 4 illustrates a configuration of a second embodiment.

FIG. 4 illustrates the embodiment 2.

In the embodiment 2, based on the output type information, a progressive order is controlled.

A decoding part is provided to decode code data in a plurality of progressive orders (an order of code sequences included in the code data). Therewith, a suitable progressive order can be selected based on the output type information.

Upon printer output, printer output can be performed after completely decoded image data is generated. However, decoding reproduction should be made merely for each limited amount of image data.

Accordingly, code data is completely decoded partially in sequence (rater sequence) upon processing with printing decoding sequential printing processing. Thereby, processing is proceeded with, upon receiving of data in the raster sequence, and thus, memory saving efficient processing can be achieved.

Generally speaking, a printer outputs an image from left to right in a main scan direction and top to bottom in a sub-scan direction, in the raster sequence. Especially, by progressive decoding in an order from an area corresponding to the printer image output order, data of a required image area is positively decoded in advance, and thus, efficient image output can be achieved (see FIG. 5).

On the other hand, upon output to a display system, the entire display screen can be viewed at once. Accordingly, as shown in FIG. 5, gradually decoding throughout the entire image area is preferable.

Accordingly, upon displaying, by progressive decoding for each layer (hierarchy), the entire view of the image can be known from an earlier stage. However, a scope which can view at once may be limited to a given display area. Accordingly, upon displaying, by progressive decoding for each layer of code data of an area including the display area, the entire view of the image can be known from an earlier stage.

When the progressive order is controlled based on the output type information, processing is made in the following order: first, the output type information (for example, whether a printer or a display) is read, and, based thereon, the decoding progressive order is determined.

The code data is read, from a code data storage part, in the thus previously determined decoding progressive order, is decoded, and the decoded data is output.

In the embodiment 2, the progressive order can be controlled based also on the original type information. Thereby, an important information attribute can be known from an earlier storage upon displaying.

The original type information indicates an original type such as an original including characters, a picture original, or such. Generally speaking, in an image processing apparatus, upon reading an image, an original type is recognized. Alternatively, upon a coding process, edge information is examined or such, and thus, an original type is determined.

For a picture original not including characters, line drawings or such, by resolution progressive decoding instead of progressive decoding for each layer, middle tone can be viewed from an earlier stage. Accordingly, display reproduction is performed in such a manner that, from a defocus state, a focus state gradually occurs.

On the other hand, for a case of an original including characters, line drawings or such, by layer progressive decoding, display reproduction can be made in such a manner that, a contour becomes gradually clearer from an earlier stage.

The following processing is made upon controlling the progressive order based on the original type information: first, the output type information and the original type information are read, and based thereon, the decoding progressive order is determined.

Code data is then read from the code data storage part, in the thus previously determined decoding progressive order, is decoded, and the decoded data is output.

An embodiment 3 is described next.

The embodiment of the present invention is advantageous for code data in such a coding type that, for a code data file configured by a plurality of code sequences, code sequences can be edited on code level.

That is, an embodiment of the present invention is directed to code data, such as data coded according to JPEG2000 (ISO/IEC 15444-1) standard, which is hierarchically coded (multiple resolution coded), for which the progressive order can be controlled, and also, partial code data can be easily accessed.

Upon coding according to JPEG2000 standard, as disclosed in Japanese Laid-open Patent Application No. 2003-169333, editing on code level can be easily performed, and a hierarchy level of code data can be easily selected for a resolution level, an area level or such.

A code data generating process according to JPEG2000 (ISO/IEC 15444-1) standard will now be described mainly for accessing of code data on code level and editing.

Figure 6:
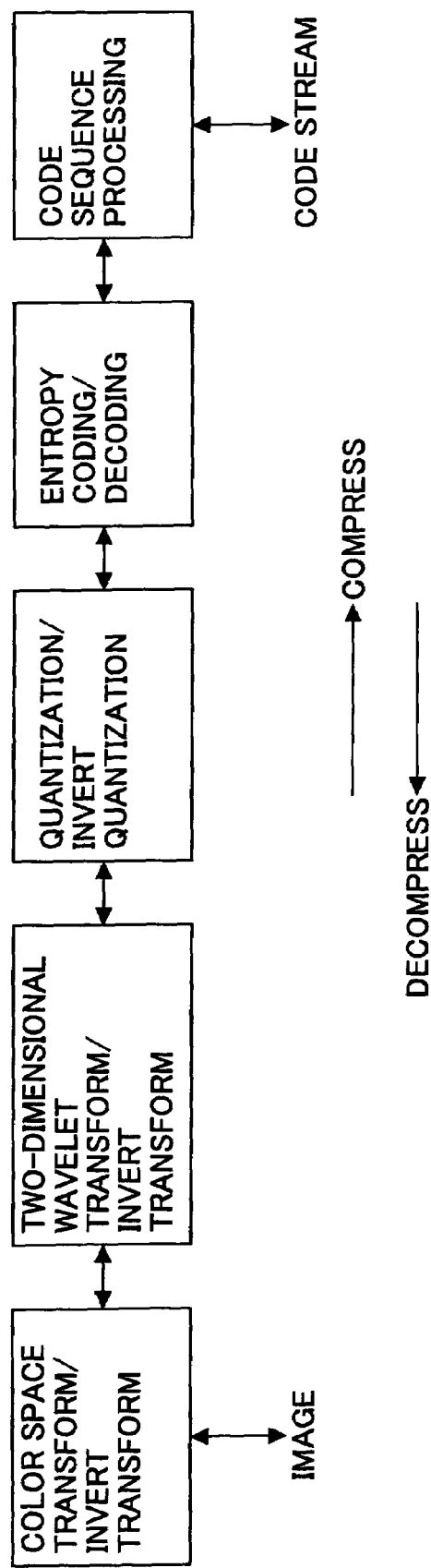
FIG. 6 illustrates a base of hierarchical coding compression/decompression algorithm.

(A) Abstract of JPEG2000 Coding Processing:

As shown in FIG. 6, coding processing according to JPEG2000 includes a color space transform/invert transform unit, a two-dimensional wavelet transform/invert transform unit, a quantization/inverse quantization unit, an entropy coding/decoding unit (bitplane coding), and a code sequence processing unit (tag processing, packet generation).)

(1) First, in the color space transform unit, interlaced image frame data is transformed into Y, Cr, Cb color component data. For each color component data, (2) two-dimensional wavelet transform is performed.)

(3) Scalar quantization according to JPEG2000 is performed on thus-obtained wavelet coefficients.

Figure 7:
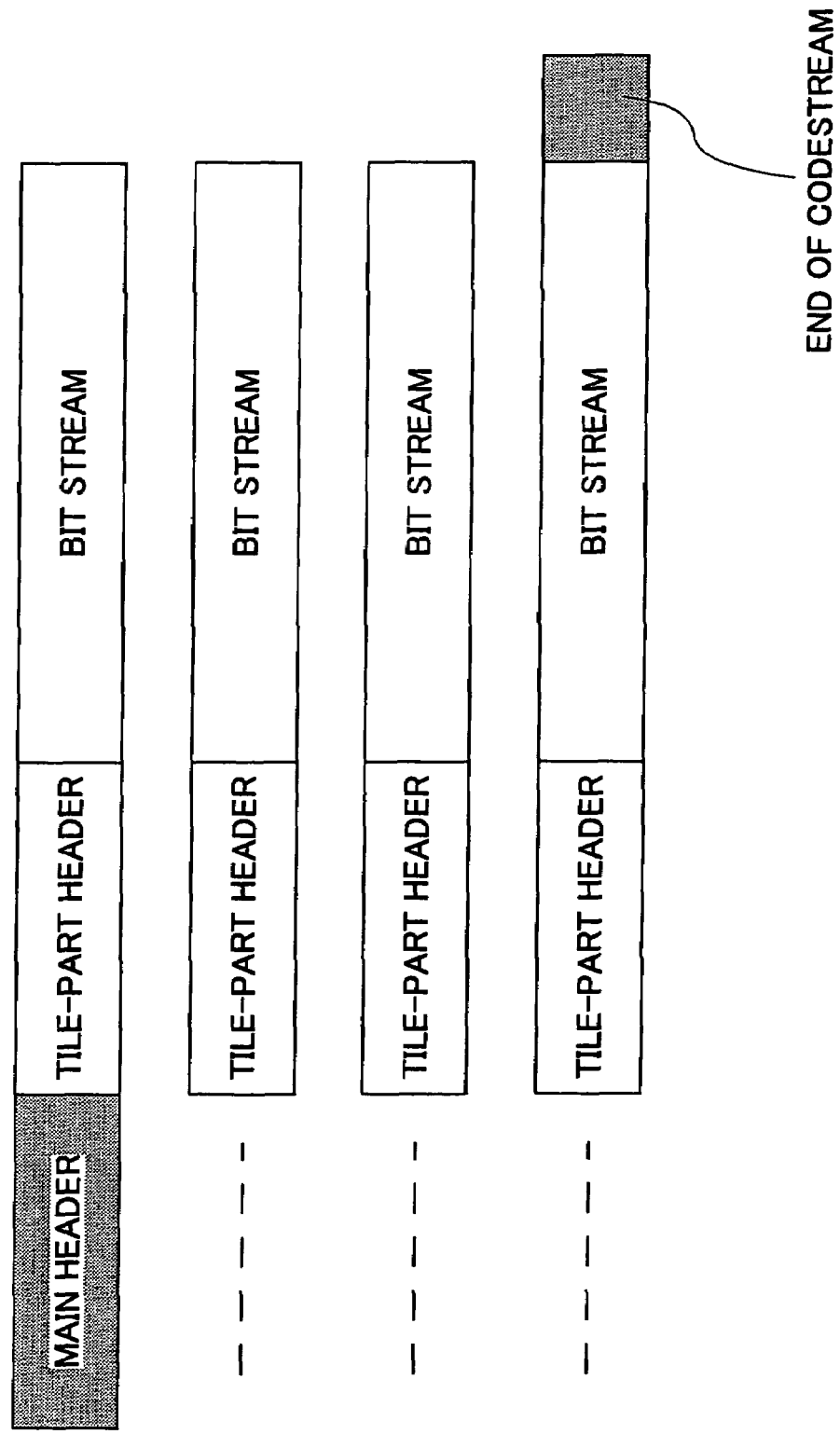
FIG. 7 illustrates a code stream structure.

(4) On thus-scalar-quantized data, entropy coding (so-called coefficient modeling arithmetic coding) is performed. After the above-mentioned steps of (2) through (4) are performed on each color component, (5) a code sequence (a code stream shown in FIG. 7) according to JPEG2000 is generated.

Figure 8:
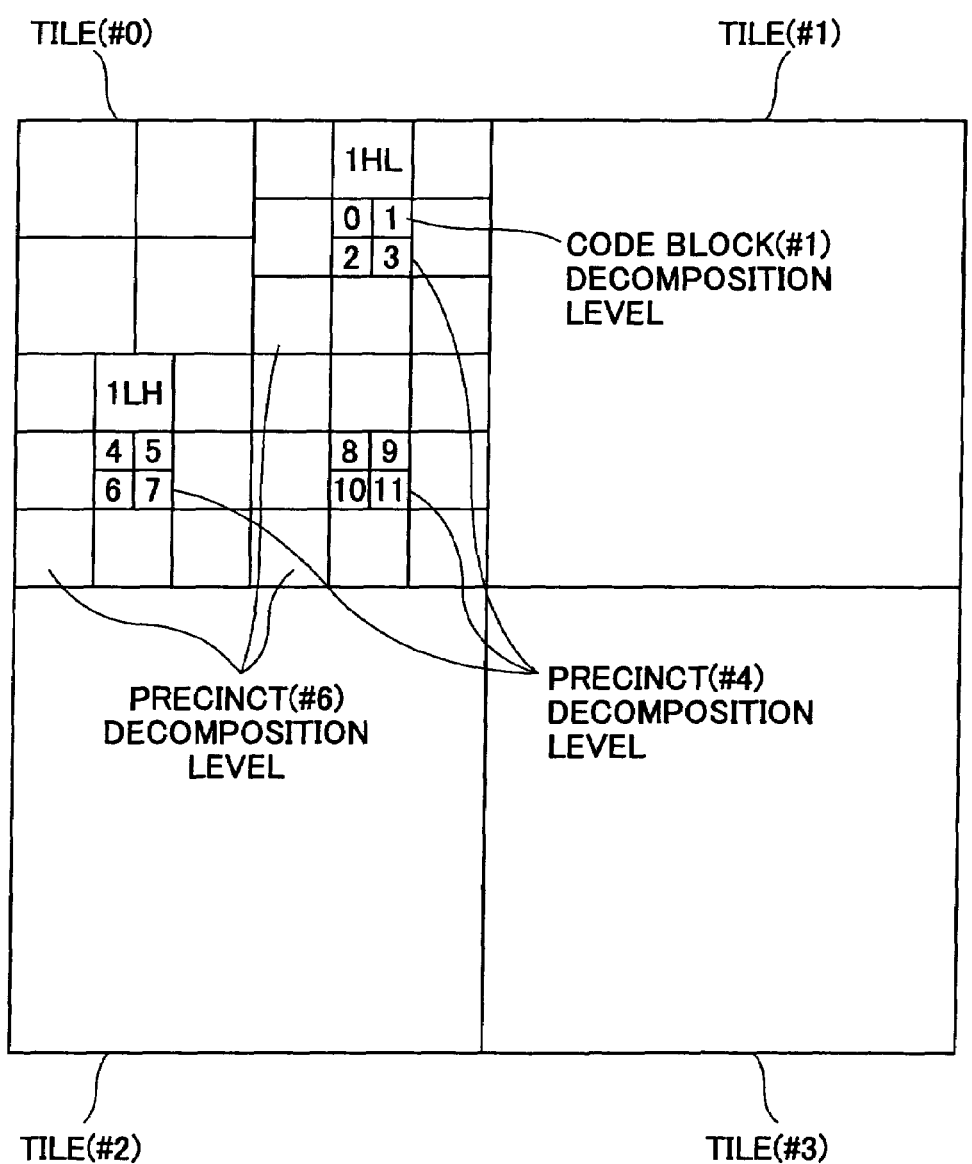
FIG. 8 illustrates precinct and code block.

FIG. 8 shows relationship between image data, and code and tiles, subbands, precincts and code blocks as code production units. Tiles are units of image data obtained as a result of a given image being divided into rectangles. When the number of dividing is one, only one tile is provided. Each particular tile is regarded as separate image data, and is wavelet transformed. The tile is transformed into YUV or YCbCr from RGB by the color space transform unit, the two-dimensional wavelet transform unit carries out wavelet transform for each color component, and thus, subbands are generated, and quantization is performed on each subband.

The precinct is one divided from the subband into rectangles (having a size designateable by a user) (see FIG. 9), and indicates a position in the tile (image). It is noted that, as shown in FIG. 9, the precinct is a collection of the above-mentioned divisions for three subbands HL, LH, HH, and three precincts form one unit. However, a precinct divided from LL subband forms a unit by a single precinct.

The precincts are generated as a result of a tile of image data being wavelet transformed, and are made of code data of an area of the tile (image). Code data corresponding to a precinct access unit is code data of a precinct area in the tile (image). The code blocks are obtained when the precinct is further divided into rectangles having a size designateable by a user.

Subband coefficients after the quantization are bitplane coded for each code block. There, one bitplane is decomposed into three sub-bitplanes and coded. A packet is obtained as a result of collecting part of the code from all the code blocks included in the precinct. For example, bitplane code is collected for three bitplanes from MSB, from all the code blocks. The above-mentioned "part" may be empty. In such a case, the packet is empty in terms of code.

By collecting the packets for all the precincts (=all the code blocks=all the subbands), a part of the codes corresponding to the entire image is obtained. For example, the three bitplanes from MSB of codes of the wavelet coefficients of all the image area are obtained. This is called a layer. The layer is a part of the bitplane code of all the image. By collecting all the layers, the bitplane code for all the image area is obtained.

Figure 10:
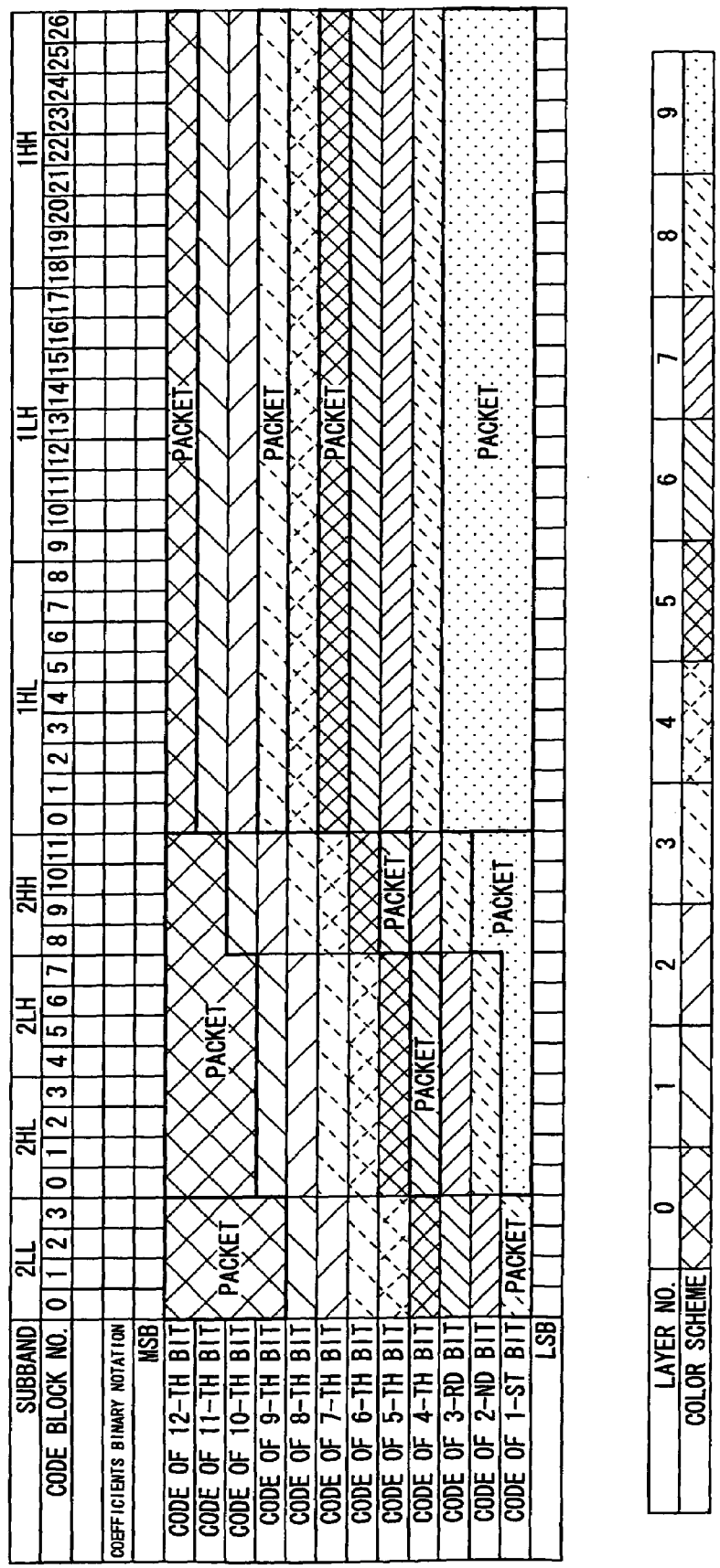
FIG. 10 illustrates a bitplane coding example and a relationship between layer and packet.

FIG. 10 shows one example of a layer configuration, where the number of wavelet transform hierarchy levels (decomposition levels)=2; and the precinct size=subband size, and, packets are included there. Since the precinct size=the subband size, and the code block has the same size as that of the precinct of FIG. 8. Accordingly, the subband on the decomposition level 2 is divided into four code blocks, and the subband on the decomposition level 1 is divided into nine code blocks.

The packet is made of precinct units. Accordingly, when the precinct=the subband, the packet includes HL through HH subbands. In FIG. 10, some packets are shown by bold lines. The packet is a 'collection of part of code extracted from the code blocks'.

In a bitplane coding unit, code, before code is discarded, is produced, bit truncation (discarding of code in code block units) and code amount fine adjustment are performed in a post quantization unit, a sequence of packets are produced, and code in a JPEG2000 code format is produced in an arithmetic coding unit. The sequence of packets is called the progressive order. Code data according to JPEG2000 (ISO/IEC 15444-1) is configured by a code sequence unit called packet (see FIGS. 11 through 13).

The packets according to JPEG2000 (ISO/IEC 15444-1) standard are made into a sequence in the progressive order, and are arranged in precincts, resolution level, components (colors), and image quality hierarchy level (layers), respectively. The components mean color components, and coding is performed for each image tile, for each color component (see FIG. 14).

The resolution level means subband hierarchy (decomposition level). As mentioned above, the code block unit arithmetic code data is generated for wavelet coefficients collected for each subband. Therefore, the code data can be distinguished for each subband hierarchy (decomposition level).

The image quality hierarchy level (layer) corresponds to an image quality level. For example, a lowest level layer is configured by data of 3LL code block units, a subsequent layer includes data of code block units of, in addition to 3LL, 3HL through 3HH, a further subsequent layer includes data of code block units of, in addition, 2HL through 2HH, and a further subsequent highest layer includes data of code block units of, in addition, 1HL through 1HH. Thus, layer data is obtained.

Similarly, when a tile or a precinct code data is accessed, code data corresponding to all the layers (image quality hierarchy) of this tile area is accessed.

According to JPEG2000 standard, the following five types of progressions are defined, as a result of the four image elements, i.e., image quality hierarchy (layer (L)), resolution (R), component (C) and position (precinct (P)), being changed in their order:

LRCP progression: Decoding is performed in an order of precinct, component, resolution level and layer. As a result, as indexes of the layers progress, image quality of the entire image area is improved. Thus, image quality progression is achieved. It may also be called layer progression.

RLCP progression: Decoding is performed in an order of precinct, component, layer and resolution level. As a result, resolution progression can be achieved.

RPCL progression: Decoding is performed in an order of layer, component, precinct and resolution level. Accordingly, similar to RLCP, resolution progression can be achieved. Also in this case, priority for a specific position can be improved.

PCRL progression: Decoding is performed in an order of layer, resolution level, component and precinct. Accordingly, decoding for a specific position can be performed with priority, and thus, spatial position progression can be achieved.

CPRL progression: Decoding is performed in an order of layer, resolution level, precinct and component. Accordingly, component progression can be achieved. That is, for example, when color image progression decoding is performed, a gray image can be reproduced first.

The progression order indicating the code sequence order of code data according to JPEG2000 standard is written in a header of the code data. As a result, by analysing the header of the code sequence, a specific packet (code sequence) can be accessed in packet (code sequence) units.

That is, coding control for each hierarchy level on code level can be performed easily since code data is based on JPEG2000 (ISO/IEC 15444-1).

On the other hand, upon decoding, inverse to the coding procedure described above, image data is generated from a code stream of each tile of each component. This process is briefly described with reference to FIG. 6.

First, in code sequence processing (tag processing, packet generation), a tag attached to the code stream (a part or all of data which is separately decodable in image data to perform decode processing) input externally is interpreted, the code stream is decomposed into code streams of respective tiles, and decoding is performed on the code stream of each tile of each component.

In an order based on the tag information of the code stream, a position of a bit to decode is determined. In an entropy decoding unit, a context is generated from an arrangement of peripheral bits (for which decoding has been already finished) of the target bit position. Decoding is performed from the context and the code stream by means of probability estimation. Thus, the target bit is generated, and is written in the bit position. At this time, the entropy decoding unit decodes the separately decodable code data, and does not perform decoding on code which is not in a separately decodable state.

Then, in an inverse quantization unit, inverse quantization is carried on data generated with the use of quantization coefficients, and thus, wavelet coefficients are obtained. The data thus obtained from decoding is one spatially divided in frequency bands, and as a result, each tile of each component of image data can be reproduced from a two-dimensional wavelet inverse transform process in a two-dimensional wavelet inverse transform part. The reproduced data is transformed into image data of the original color system by a color (spatial) inverse transform unit.

According to one embodiment of the present invention, progressive decoding is performed in which code data is decoded gradually part by part.

When an image is progressively decoded in area units, since the code data is divided in area units and are separately coded, decoding for each area can be performed separately. Since a decoded image decoded in area units is also exclusive in output areas, an image can be generated only by connecting decoded results obtained from separate decoding.

When an image is progressively decoded in layer units or in resolution units, typically, in a process of decoding code data partially in layer units or resolution units in sequence, the wavelet coefficients generated in the inverse quantization are temporarily stored.

Then, all or part of the stored wavelet coefficients are read out and are inverse wavelet transformed. Then, the color (spatial) inverse transform is performed, and thus, an image is reproduced. The wavelet coefficients are linearly summed and updated in a process of decoding of the code data partially in layer units or resolution units in sequence. Thus, progressive decoding output is achieved.

In the embodiment 3, with the use of the progressive decoding function, the progressive order is controlled based on the output type information.

(B) Access Way Control:

As described above, the code data of JPEG2000 is made of packet units; thus access in packet units is allowed, and, new code can be easily generated with extraction of necessary code sequences (packets) from original code.

As a result, from the original code, partial code can be decoded as is necessary. For example, when a large image stored in the server is displayed on the client, only code of required image quality, only code of required resolution, only code of desired position, only code of desired component, or such, may be received from the server, and decoded.

A protocol for receiving only required code from JPEG2000 code in the server is called JPIP (JPEG2000 Interactive Protocol), and a study is being made currently in ISO for standardization.

As to a protocol for partially accessing hierarchical code data, IIP (Internet Imaging Protocol) is disclosed by Japanese Laid-open Patent Application No. 11-205786 for accessing FlashPix which is multi-resolution expression of an image. Further, as to JPIP, Japanese Laid-open Patent Application No. 2004-274758 discloses. Japanese Laid-open Patent Application No. 2003-23630 discloses a cache model in JPIP.

According to one embodiment of the present invention, as described above with reference to FIG. 3, code data for a desired area is designated from the client to the server. Then, the server transmits code data covering the desired area. The same way is applied also for transmitting code data of a certain hierarchical level.

When packets are extracted in precinct units, packets of desired precincts can be transmitted as a result of the desired precincts being determined, and the packets therefor being extracted.

When code data is accessed in area units, by determining a desired area and extracting packets therefor in a process of extracting packets of an area covering the desired area, in precinct units, only the packets of the area covering the desired area can be extracted and transmitted.

When code data is accessed in layer units, by determining desired layers and extracting packets therefor in a process of extracting packets of the desired layers, in precinct units, only the packets of the area covering the desired layer can be extracted and transmitted.

According to one embodiment of the present invention, by using the progressively decoding function, the access unit is controlled based on the output type information.

For example, this processing is performed in the following procedure: first, the output type information and the image area destination are read, based on the output type information the access way for code data corresponding to the designated image area is determined.

The coding data is read from the code data storage part, based on the thus-determined access way, is decoded, and output.

As described above, in an image processing apparatus in which the access unit of code data is selected from the area unit and the layer unit for the code data such as that based on JPEG2000 (ISO/IEC 15444-1) standard, printer output is made in tile units as the access units. Accordingly, by accessing in code data units corresponding to actual image areas, efficient memory saving printing processing is achieved.

On the other hand, for display output, the access unit is the layer unit. Accordingly, code data can be accessed in layer units. Thus, a general view of the entire area of a given image can be known from an earlier stage.

When code data is accessed based on JPIP (JPEG2000 Interactive Protocol) standard, and, as a typical example, for printer output as the output type in which complete decoding in sequence (raster sequence) is preferable, JPT-stream is selected as the access way such that complete code data is accessed part by part in tile units.

On the other hand, for display output in which gradual decoding throughout the entirety of a display area as the output type, JPP-stream is selected as the access way. Thus, code data is accessed in fine units gradually throughout the entirety of the display area, and is reproduced. When the display is made part by part, also JPP-stream is selected as the access way, and code data is accessed for the area.

Thus, according to one embodiment of the present invention, when output is made to a printer, code data is accessed in the progressive order in area units of tile units or precinct units according to JPEG2000 (ISO/IEC 15444-1) standard. Thereby, the code data can be accessed easily in area units in coding based on JPEG2000 (ISO/IEC 15444-1) standard.

Next, an embodiment 4 is described.

Figure 15:
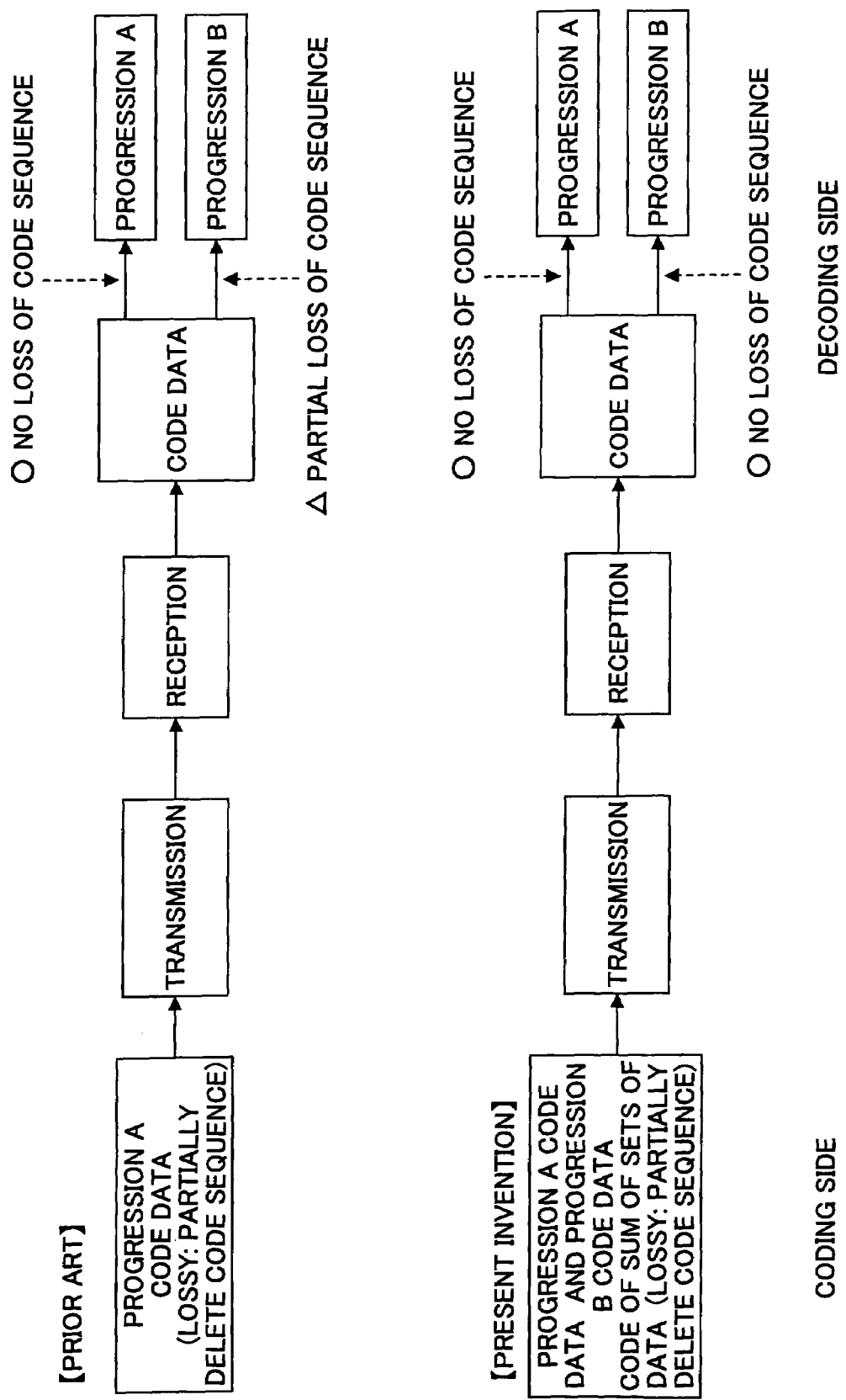
FIG. 15 illustrates a concept of an embodiment 4.

FIG. 15 illustrates a concept of the embodiment 4.

In the embodiment 4, code sequences, in which progression is changed on a decoding side, is produced, and decoding is performed on the newly produced code sequence. As the progression, for example, spatial resolution, image quality, color component and so forth, may be used as progressive (quality), When the progression is changed after lossy code data in which code sequences are partially deleted is produced on a coding side, partial loss may occur in code sequences in the code data after the progression is changed, in the related art.

Figure 16:
FIG. 16 illustrates progression switching in the embodiment 4.

FIG. 16 shows such a situation, in an example of code data.

The code data of FIG. 16 includes, totally, 8 code sequences having resolution of 3 levels (resolution 0 through resolution 2); and two layers (layer 0 through layers 1).

The code data may be configured in one of two code sequence orders, i.e., layer processing or resolution progression.

In code data configured in the layer progression, when decoding is tried, as a result of a configuration being changed from the code data in which layer 1 level code sequences are deleted, to the code data in which resolution 3 level code sequences are deleted in the resolution progression, generation cannot be achieved since packets 4, 5 and 6 are thus deleted.

Contrary, when decoding is tried, as a result of a configuration being changed from the code data in which resolution 3 level code sequences are deleted in the resolution progression to the code data in which layer 1 level code sequences are deleted in the layer progression, generation cannot be achieved since packet 3 lacks.

Figure 17:
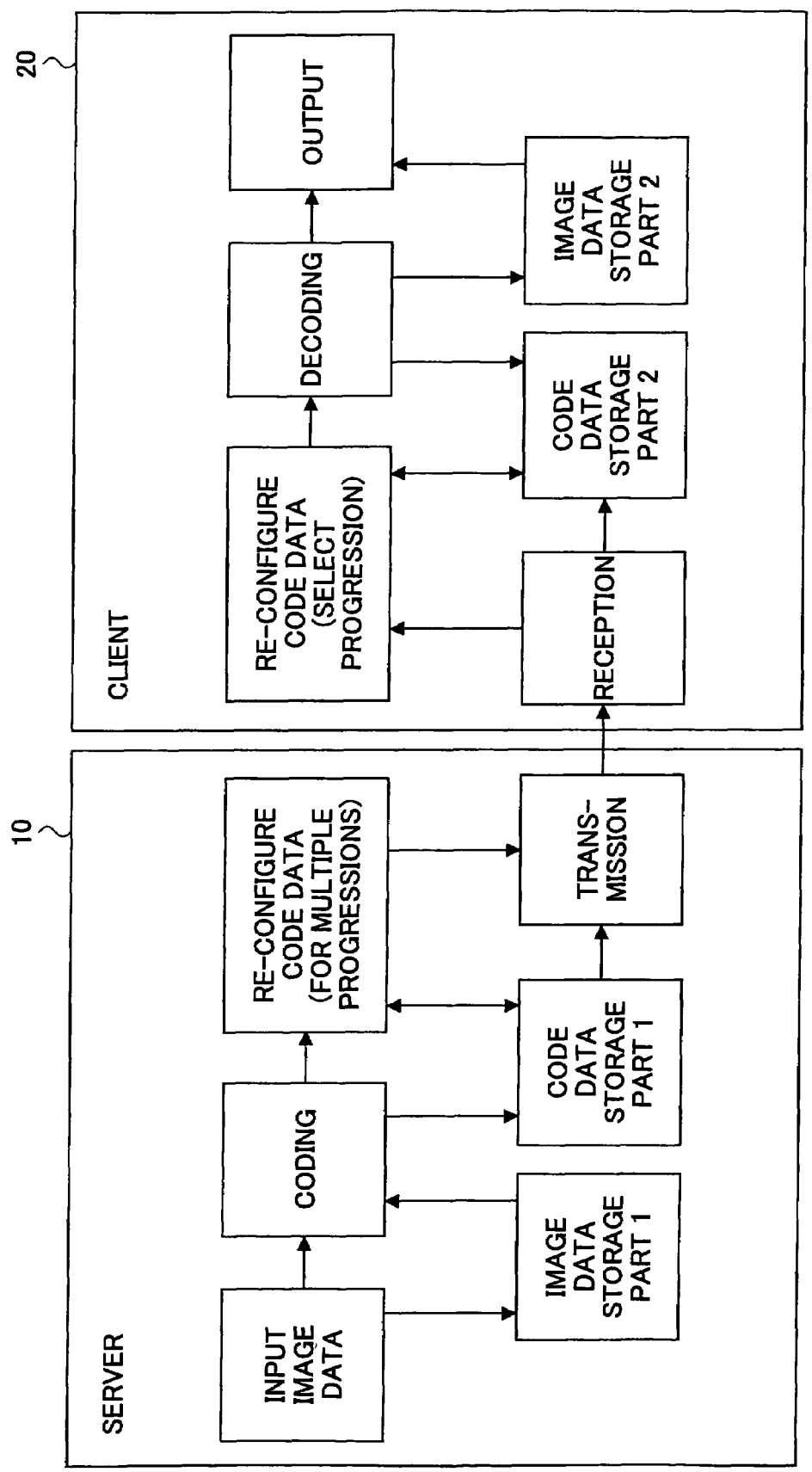
FIG. 17 illustrates a configuration of the embodiment 4.
Figure 18:
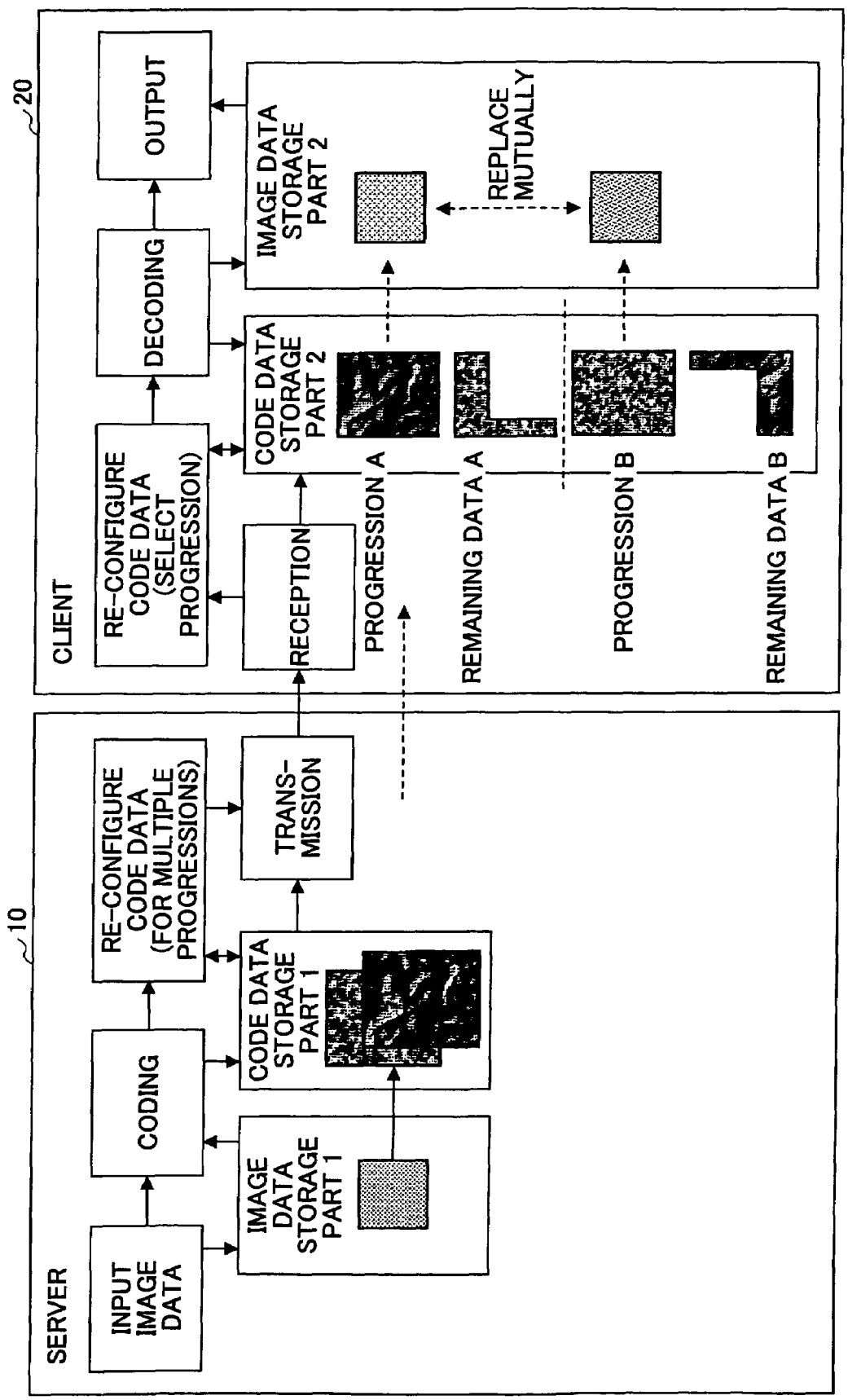
FIG. 18 illustrates a flow of code data in the embodiment 4.

FIG. 17 illustrates a configuration of the embodiment 4.
FIG. 18 illustrates a code data flow.

The server 10 stores image data input in an image data input unit, codes the image data, and stores the thus-produced code data in a code data storage unit 1.

Further, when producing lossy code data in which code sequences are partially deleted, the server 10 re-configures code data in code data re-configuration processing, generates code data for a plurality of progressions, produces code data of a sum of sets of code sequences and stores it in the code data storage unit 1.

The thus-re-configured code data in the server 10 is transmitted to the client 20 in a transmission processing unit.

The client 20 receives it in a reception processing unit, stores it in a code data storage unit 2. Also, a code data re-configuration (progression selection) unit selects one progression of the code data, re-configures code data based on the selection for decoding, and reproduction is performed in an output processing unit. When one progression code data is re-configured, code sequences, not used, are left in the code data storage unit 2.

In transmission code data selection control in the server 10, progression is selected in such a manner as to, based on a traffic (response) and a processing load of the server itself, avoid a transfer delay, and thus, code data is generated, and transmitted to the client 20.

With reference to FIG. 18, a code data flow is described.

The server 10 has image data input, generates code data having a plurality of progressions, and transfers code sequences of a sum of sets thereof to the client 20. The client 20 selects a progression, generates code data, and carries out decoding reproduction.

The client 20 leaves code sequences which are useless for generating the code data of the certain progression, in the code data storage unit 2.

When reproduction with a change in the progression is required, the code sequences thus left in the code data storage unit 2 are used for re-configuring code data for the other progression, and decoding reproduction is performed. Code sequences not used there are left.

By using the code sequences thus left and stored, code data for a different progression can be decoded and reproduced without re-loading otherwise lacking code sequences.

An embodiment 5 is described next.

In the embodiment 5, code data based on JPEG2000 standard is applied in the embodiment 4.

JPEG2000 (ISO/IEC 15444-1) standard coding and Motion JPEG2000 standard are described first. Japanese Laid-open Patent Application No. 2003-169333 discloses details of JPEG2000.

(A) Abstract of JPEG2000 Coding Processing:

As shown in FIG. 6, coding processing according to JPEG2000 includes a color space transform/invert transform unit, a two-dimensional wavelet transform/invert transform unit, a quantization/inverse quantization unit, an entropy coding/decoding unit (bitplane coding), and a code sequence processing unit (tag processing, packet generation).

(1) First, in the color space transform unit, interlaced image frame data is transformed into Y, Cr, Cb color component data. For each color component data, (2) two-dimensional discrete wavelet transform is performed.

(3) Scalar quantization according to JPEG2000 is performed on thus-obtained wavelet coefficients.

(4) On thus-scalar-quantized data, entropy coding (so-called coefficient modeling arithmetic coding) is performed. After the above-mentioned steps of (2) through (4) are performed on each color component, (5) code sequences (code streams shown in FIG. 7) according to JPEG2000 are generated.

(6) The server generates code sequences of a plurality of progressions, and produces code data from code sequences of a sum of sets of the code data.

FIG. 8 shows relationship between image data and code and tiles, subbands, precincts and code blocks as code production units. Tiles are units of image data obtained as a result of a given image being divided into rectangles. When the number of dividing is one, only one tile is provided. Each particular tile is regarded as a separate image data, and is wavelet transformed. The tile is transformed into YUV or YCbCr from RGB by the color space transform unit, the two-dimensional wavelet transform unit carries out wavelet transform for each color component, and thus, subbands are generated, and quantization is performed in subband units.

The precincts are ones divided from the subband into a rectangles (having a size designateable by a user) (see FIG. 9), and indicates a position in the tile (image). It is noted that, as shown in FIG. 9, the precinct is a collection of the above-mentioned divisions for three subbands HL, LH, HH, and three precincts form one unit. However, a precinct divided from LL subband forms a unit by a single precinct.

The precincts are generated as a result of a tile of image data being wavelet transformed, and are made of code data of an area of the tile (image). Code data corresponding to a precinct access unit is code data of a precinct area in the tile (image). The code blocks are obtained when the precinct is further divided into rectangles having a size designateable by a user.

Subband coefficients after the quantization are bitplane-coded in code block units. There, one bitplane is decomposed into three sub-bitplanes and coded. A packet is obtained as a result of collecting part of the code from all the code blocks included in the precincts. For example, bitplane code is collected for three bitplanes from MSB from all the code blocks. The above-mentioned "part" may be empty. In such a case, the packet is empty in terms of code.

By collecting the packets for all the precincts (=all the code blocks=all the subbands), a part of the codes corresponding to the entire image is obtained. For example, three bitplanes from MSB of codes of the wavelet coefficients of all the image area are obtained. This is called a layer. The layer is a part of the bitplane code of the entire image. By collecting all the layers, the bitplane code of all the image area is obtained.

FIG. 10 shows one example of a layer configuration, where the number of wavelet transform hierarchy levels (decomposition levels)=2; and the precinct size=subband size, and packets included there. Since the precinct size=the subband size, and the code block has the same size as that of the precinct of FIG. 8. Accordingly, the subband on the decomposition level 2 is divided into four code blocks, and the subband on the decomposition level 1 is divided into nine code blocks.

The packet is made of precinct units. Accordingly, when the precinct=the subband, the packet includes HL through HH subbands. In FIG. 10, some packets are defined by bold lines. The packet is a 'collection of part of code extracted from the code blocks'.

In the bitplane coding unit, code, before code is discarded, is produced, bit truncation (discarding of code in code block units) and code amount fine adjustment are performed in a post quantization unit, a sequence of packets are produced, and code in a JPEG2000 code format is produced in an arithmetic coding unit. The order of the packets is called a progressive order. Code data according to JPEG2000 (ISO/IEC 15444-1) is configured by code sequence units called packets (see FIGS. 11 through 13).

The packets according to JPEG2000 (ISO/IEC 15444-1) standard are made into a sequence in the progressive order, and are arranged in precincts, resolution level, components (colors), and image quality hierarchy level (layers), respectively. The components mean color components, and coding is performed for each image tile, for each color component (see FIG. 14).

The resolution level means subband hierarchy (decomposition level). As mentioned above, the code block unit arithmetic code data is generated for wavelet coefficients collected in subband units. Therefore, code data can be distinguished in subband hierarchical levels (decomposition levels).

The image quality hierarchy level (layer) corresponds to an image quality level. For example, a lowest level layer is configured by data of 3LL code block units, a subsequent layer includes data of code block units of, in addition to 3LL, 3HL through 3HH, a further subsequent layer includes data of code block units of, in addition, 2HL through 2HH, and a further subsequent highest layer includes data of code block units of, in addition, 1HL through 1HH. Thus, layer data is obtained.

Similarly, when tile or precinct code data is accessed, code data corresponding to all the layers (image quality hierarchy) of this tile area is accessed.

According to JPEG2000 standard, the following five types of progressions are defined, as a result of the four image elements, i.e., image quality hierarchy (layer (L)), resolution (R), component (C) and position (precinct (P)), being changed in their order:

LRCP progression: Decoding is performed in an order of precinct, component, resolution level and layer. As a result, as the indexes of layers progress, an image quality of the entire image area is improved. Thus, image quality progression is achieved. It may also be called layer progression.

RLCP progression: Decoding is performed in an order of precinct, component, layer and resolution level. As a result, resolution progression can be achieved.

RPCL progression: Decoding is performed in an order of layer, component, and precinct and resolution level. Accordingly, similar to RLCP, resolution progression can be achieved. Also in this case, priority for a specific position can be improved.

PCRL progression: Decoding is performed in an order of layer, resolution level, component and precinct. Accordingly, decoding for a specific position can be performed with priority, and thus, spatial position progression can be achieved.

CPRL progression: Decoding is performed in an order of layer, resolution level, precinct and component. Accordingly, component progression can be achieved. That is, for example, when color image progression decoding is performed, a gray image can be reproduced first.

Thus, the progression order indicating the code sequence order of code data according to JPEG2000 standard is written in a header of the code data. As a result, by analysing the header of the code sequence, specific packets (code sequences) can access in packet (code sequence) unit.

Decoding processing is performed in the inverse procedure.

The processing may be performed by use of hardware. In this case, processing speed is increased. An image processing apparatus achieving all of the coding processing according to JPEG2000 by hardware circuits already exists.

(B) Application to Motion JPEG2000 Standard:

In motion picture data according to Motion JPEG2000 coding method, frames are applied as units, frames are hierarchically coded by a coding method employing wavelet transform, the frames thus hierarchically coded are formed in packets, and packets groups including a plurality of packets corresponding to respective hierarchical levels, are produced.

In Motion JPEG2000, frame units can be handled separately, and thus, the method according to one embodiment of the present invention can be easily applied.

According to one embodiment of the present invention, even when lossy code sequences are provided in which code sequences are partially deleted, the produced code data is re-configured, code data of a plurality of progressions is generated, and code data is produced from code sequences of a sum of sets of code data, as mentioned above.

Figure 19:
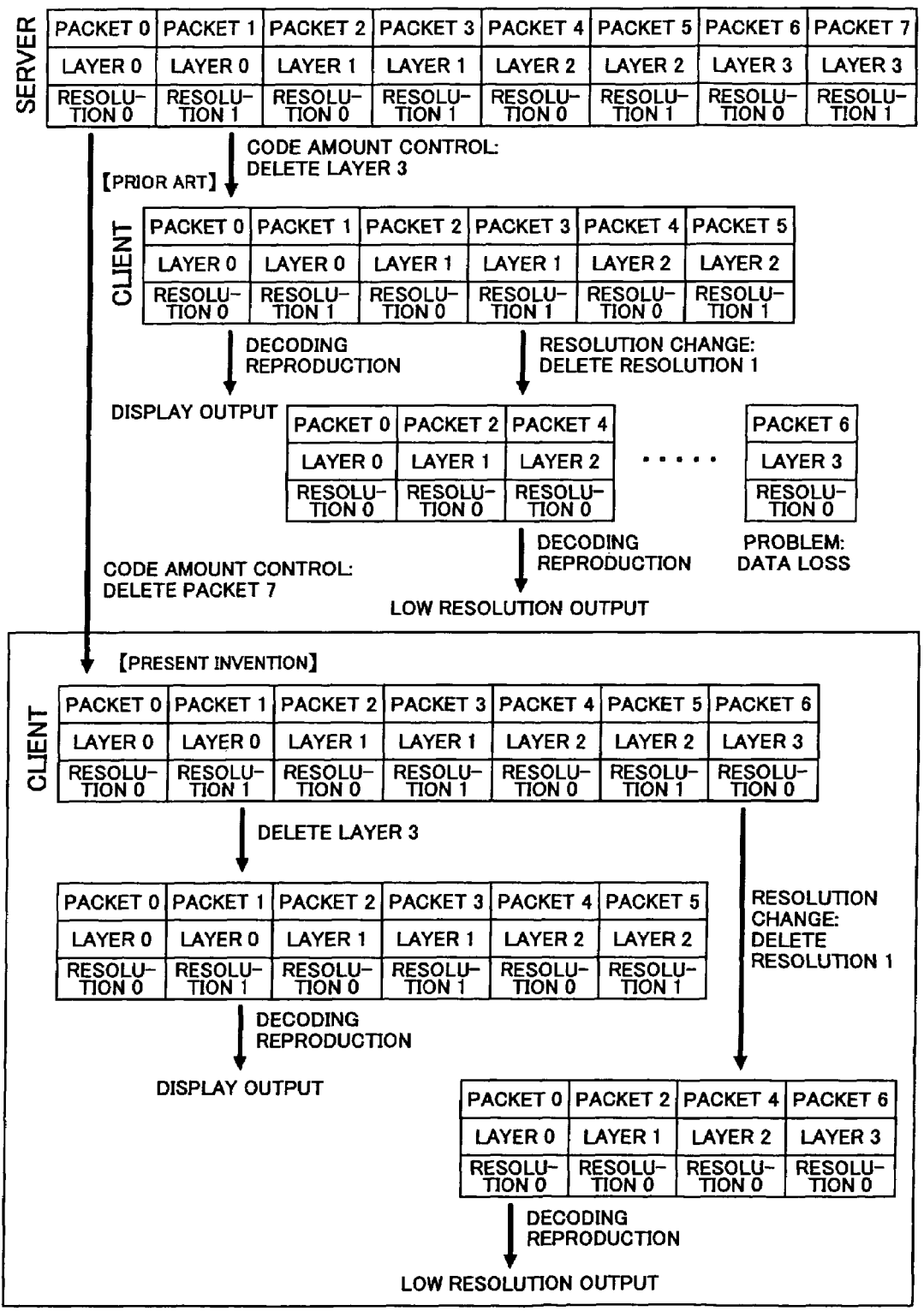
FIG. 19 shows code data configuration example for illustrating progression switching.

Code data generation in the embodiment 5 is described now with reference to FIG. 19. In the figure, code data is configured by packet units based on JPEG2000, and totally, 8 code sequences are included having two resolution levels (resolutions 0 through 1); and four layers (layers 0 through 3).

A case where code sequences of layer 3 are deleted and code data of resolution 0 is produced is described.

In the related art, the server produces code data from which code sequences of layer 3 are deleted, and transmits only 6 packets, to the client. The client deletes resolution 1 from the received code data, and carries out resolution transform. However, since code data in packet 6 lacks, image quality degradation occurs in a reproduced image unless the code sequences of packet 6 are re-loaded from the server.

In contrast thereto, in the embodiment 5, the server produces code data in which the layer 3 is deleted and code data in which the resolution 1 is deleted, produces code data of a sum of sets of both, and transmits the same to the client.

Accordingly, the client may perform display output after deleting layer 3 from the received code data, or may perform low resolution output after deleting resolution 1. In either case, the client can perform decoding reproduction without any shortage of code sequences, and thus, without necessity of re-loading from the server.

An embodiment 6 is described next.

In a system in which a web server and a client transfer a compressed image therebetween with the use of JPIP, and information disclosed by the web server is referred to by the client, part of image data is reproduced instead of the image data being reproduced completely at first, low resolution image data is then first displayed and a user checks it to designate a desired image data to see in further details, and thus, the designated image area is reproduced. This way is advantageous from a background in which decoding and reproduction of only partial code data is allowed, and, in particular, such a way is advantageous for a case where, large-size image data such as a map is reproduced by a display device having merely a small display area. In such a case, it is preferable that a small area is designated from a wide scope, and then, the designated area is reproduced in detail.

In a system of reproducing such a selected partial area in detail, a destination to which the partial area of image data designated is output may be, not the display device (i.e., the display device from which the low resolution image is first displayed) from which the partial code data is reproduced first, but an image forming apparatus such as a copier, an ink-jet printer or such. This is because a demand may occur to output to paper, an OHP sheet or such, appropriately. For example, in a PDA (personal digital assistant), a cellular phone or such, which has only a small display area, since displayable scope is limited, a demand may occur to output in a wider size and view details thereof.

An image data processing system is different between the display device and the image forming apparatus. In the image forming apparatus, image data is processed in a raster sequence in area units. In the display device, image data written in a memory is then output.

In the embodiment 6, in the above-described system, when code data is reproduced, for the purpose of performing processing suitable to features of the output device/apparatus, a type of a stream when the code data is transmitted between the server and the client is controlled according to processing performed in the client, thus display processing can be performed at high speed, and also, when printing processing is performed, processing can be performed with a reduced memory at high speed.

Figure 20:
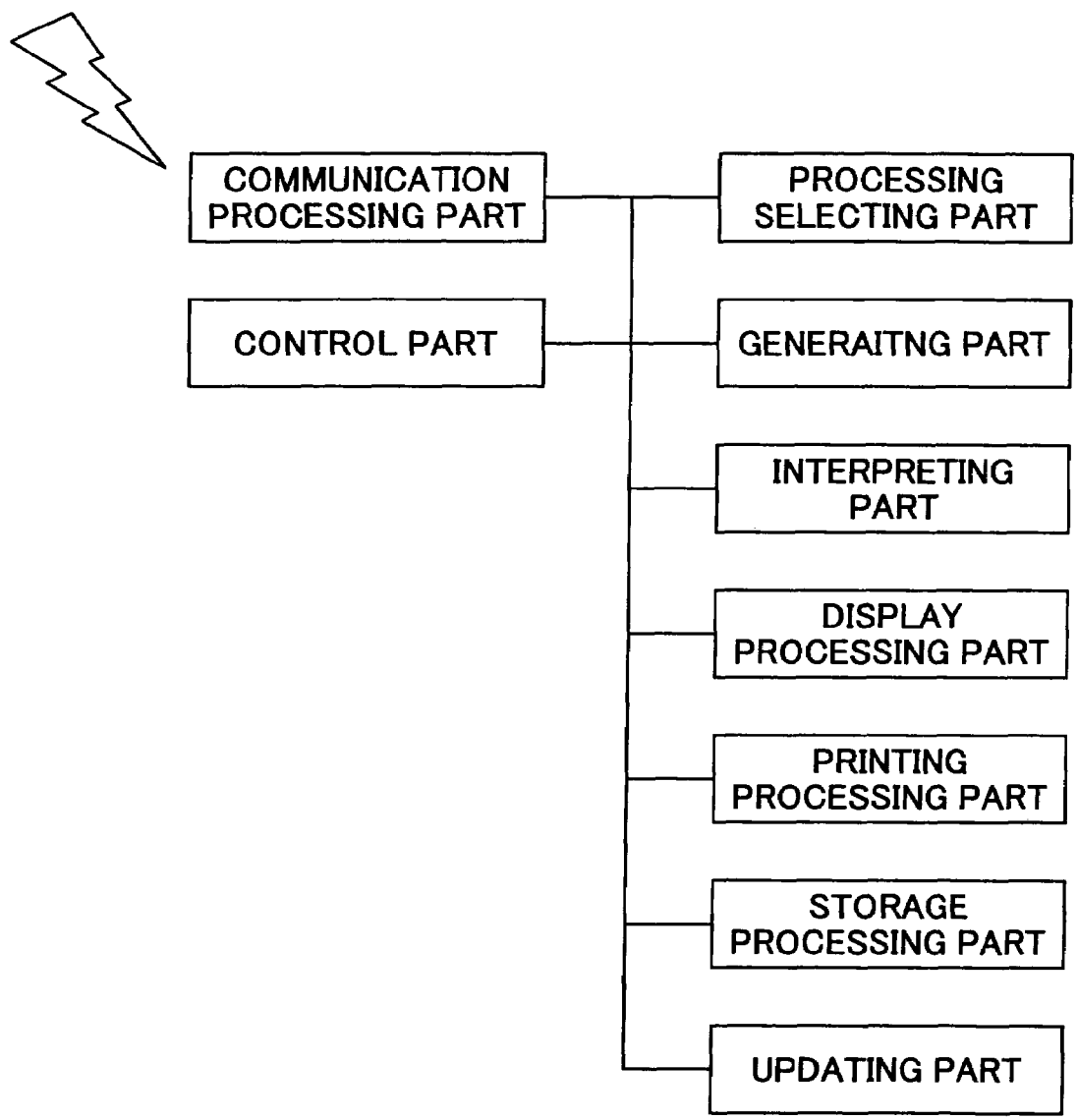
FIG. 20 illustrates a client configuration in the embodiment 4.

FIG. 20 illustrates a configuration of the client according to the embodiment 6.

The client 20 has a processing selecting unit selecting a function to perform; a generating unit generating a request instruction to the server 10; an interpreting unit interpreting a response instruction from the server 10 in response to the request instruction; a display processing unit decompressing code data received from the server 10, and displaying on an output device 105; a printing processing unit decompressing code data received from the server 10, and printing with the output device 105; a storage processing unit performing processing for storing the code data from the server 10 in a primary storage 102 or a secondary storage 103; an updating processing unit updating the code data to the server; a communication unit performing communication with the server 10 via a network 30; and a control unit controlling operation processing of the respective units of the client 20. In the embodiment 6, the above-mentioned configuration is provided. However, if other new processing is added, a corresponding processing unit should be provided additionally.

Figure 21:
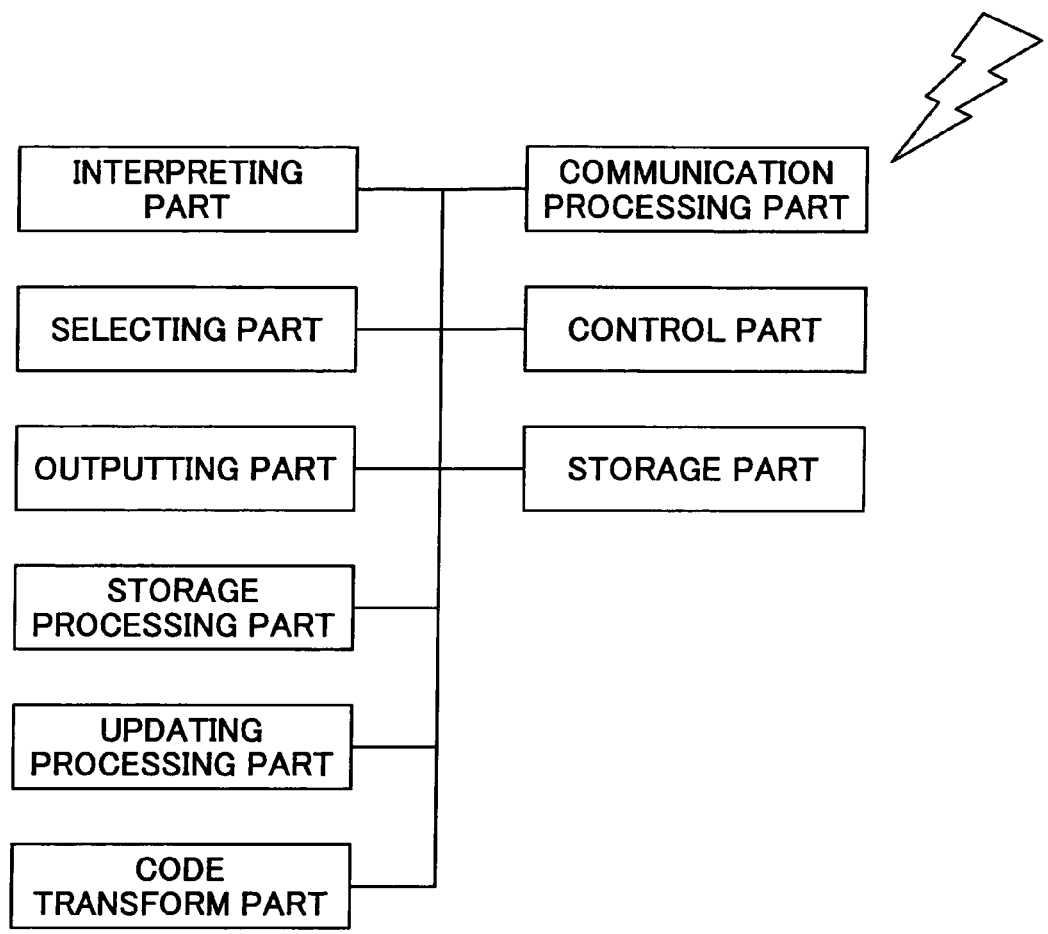
FIG. 21 illustrates a server configuration in the embodiment 4.

FIG. 21 shows a configuration of the server. The server 10 includes a storage unit storing code data of image data; a communication unit performing communication with the client $20_1$ or $20_2$ via the network 30; an interpreting unit interpreting a request received from the client, and determining designation of a processing function; a selecting unit selecting one stream type from types of streams supported by the server, based on the designation of the processing function of the received request; an output unit outputting code data to the client; an updating unit updating code data stored in the storage unit by code data transmitted by the client; a storage processing unit storing the updated code data in the storage unit; a control unit controlling operation processing of the respective units of the server 10; and a code transform unit performing code transform on the code data stored in the storage unit from a single layer into multi-layers or vise versa.

Figure 22:
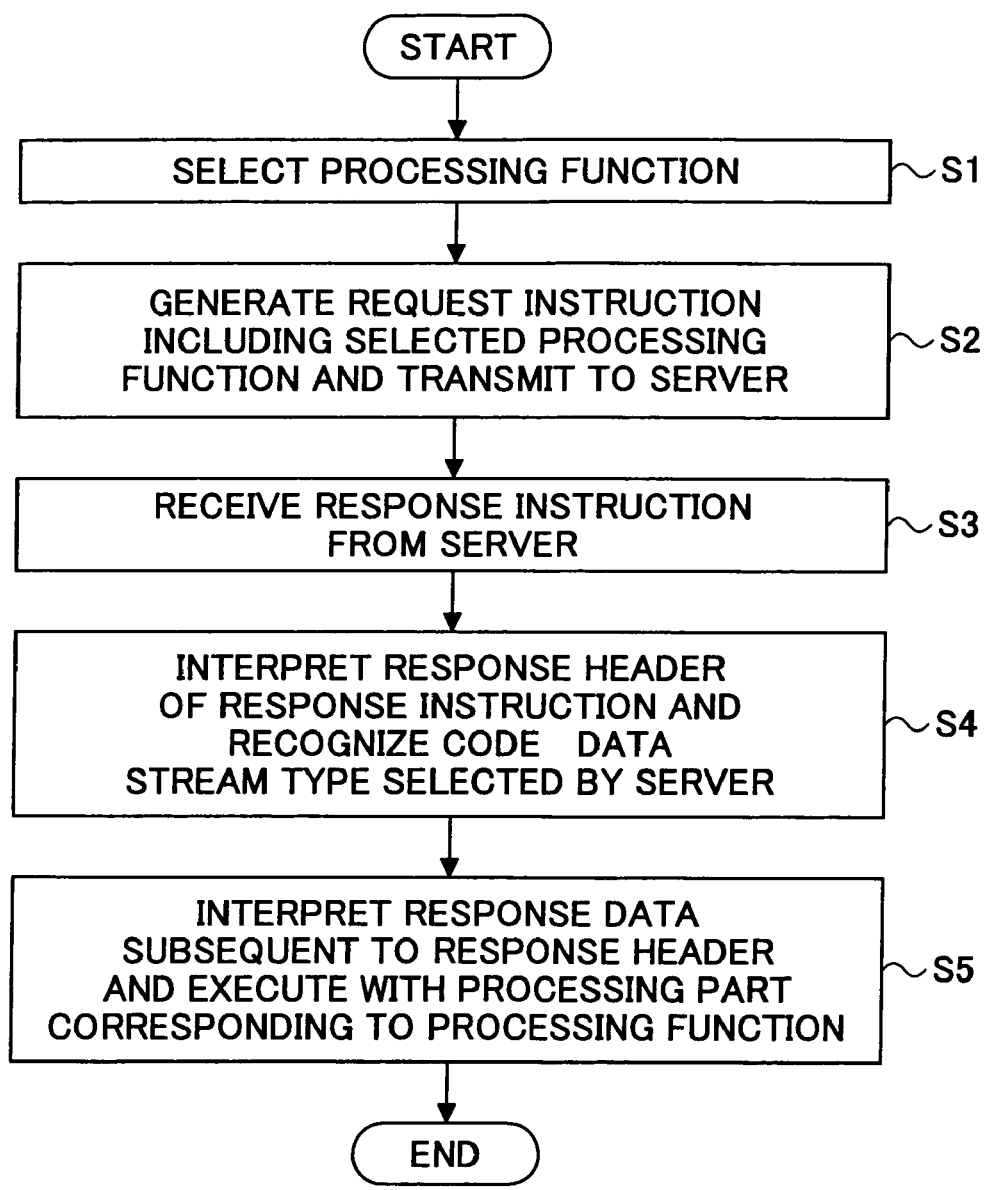
FIG. 22 shows a flow chart of processing procedure when a client prints, displays or stores code data received from a server.

FIG. 22 shows a flow chart of a processing procedure when the client 20 prints, displays with the output device 105, or stores the code data received from the server 10.

A user uses the input device 104 of the client 20, operates a menu displayed on the output device 105, and thus, selects a processing function (Step S1).

A request instruction including the designation of the processing function thus selected in Step S1 is produced, and the request instruction is transmitted to the server 10 via the network 30 by the communication part of the client 20 (Step S2). By this process of Step S2, the processing function selected by the client 20 is notified of to the server 10. This request instruction also includes destination of code data corresponding to image data. It is noted that, as an optional function, the request instruction may include setting of a stream type of the code data, image quality of the image data, and so forth.

In Step S3, a response instruction is received from the server 10 in response to the request instruction transmitted in Step S2.

Next, in Step S4, the interpreting unit of the client 20 interprets a response header of the response instruction received in Step S3. At this time, in addition to interpreting the response header, the stream type of the code data selected by the server 10 is recognized.

The processing unit (i.e., any one of the display processing unit, the printing processing unit or the storage processing unit in the embodiment 6) corresponding to the processing function selected in Step S1, interprets a response data subsequent to the response header, based on the interpretation result in Step S4 (Step S5). By this processing, the following processing is executed by the processing function selected in Step S1.

(1) When the processing function is 'display', the display processing unit of the client 20 decompresses the response data received, and displays it on the display device 105 (in this case, a display device).

(2) When the processing function is 'printing', the printing processing unit of the client 20 decompresses the response data received, and prints out it with the display device 105 (in this case, an image forming apparatus such as a printer).

(3) When the processing function is 'storage', the storage processing unit of the client 20 stores the received response data in the primary storage 102 or the secondary storage 103 (in this case, a hard disk drive or a memory) as a file.

Figure 23:
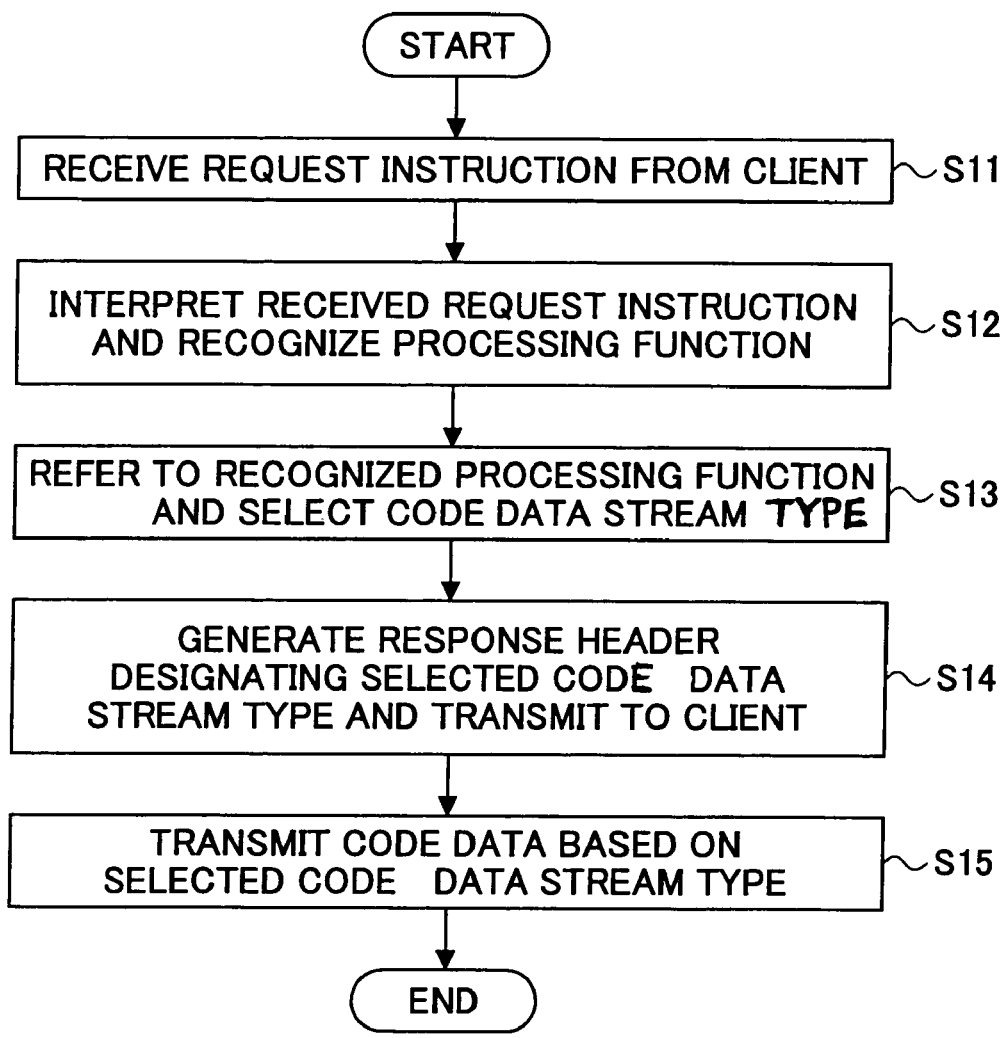
FIG. 23 shows a flow chart of processing procedure when the server receives a request instruction from the client, and responds thereto.
Figure 24:
FIG. 24 shows one example of display of an image in which code data transmitted in JPP-stream is displayed while a time is elapsing.
Figure 25:
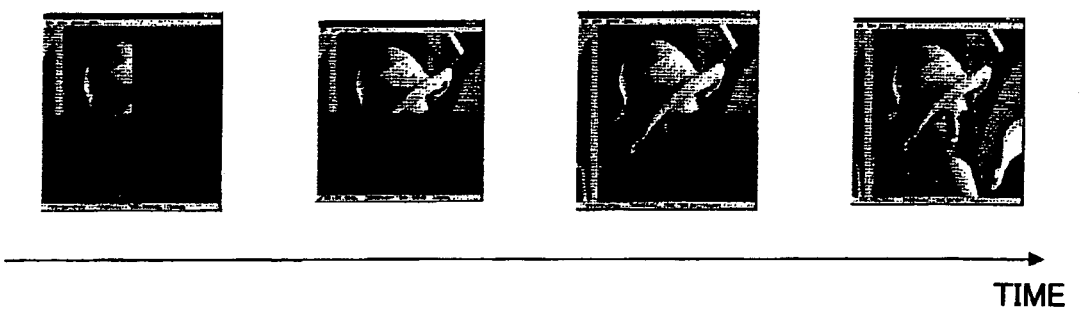
FIG. 25 shows one example of display of an image in which code data transmitted in JPT-stream is displayed while a time is elapsing.

FIG. 23 shows a flow chart indicating a processing procedure of the server 10 receiving the request instruction from the client $20_1$ or $20_2$, and performing processing in response to the request instruction.

The communication unit of the server 10 receives the request instruction from the client (Step S11).

The interpreting unit of the server 10 interprets the request instruction (Step S12). In this processing, the processing function selected by the client $20_1$ or $20_2$ is recognized.

In Step S13, the recognized processing function is referred to, and the stream type of the code data, supported by the server 10, is selected. It is noted that in the embodiment 6, the type of code data stream is either JPP-stream or JPT-stream, and either one is selected with reference to the processing function.

For example, when 'display' is selected as the processing function selected by the client $20_1$ or $20_2$, JPP-stream is selected. When 'printing', 'storage' or 'updating' is selected as the processing function selected by the client, JPT-stream is selected.

When the stream type is designated in the optional designation in the request instruction, another suitable stream type is selected when it is determined that the originally designated stream type is not suitable to the selected processing function with reference to the request instruction.

For example, when the processing function selected by the client $20_1$ or $20_2$ is 'display', the stream type is changed to JPP-stream, if the selection of the JPP-stream is allowed, when JPT-stream is originally designated in the request instruction.

Similarly, when the processing function selected by the client $20_1$ or $20_2$ is 'printing', 'storage' or 'updating', the stream type is changed to JPT-stream, if the selection of JPT-stream is allowed, when JPP-stream is originally designated in the request instruction.

The output unit of the server 10 generates the response header designating the stream type of the code data selected in Step S13, and transmits it to the client $20_1$ or $20_2$ via the communication unit of the server 10 (Step S14). By this processing, the stream type of the code data selected by the server 10 is notified of to the client $20_1$ or $20_2$.

As the response data subsequent to the response header generated in Step S14, the code data is transmitted to the client $20_1$ or $20_2$ via the communication unit of the server 10 based on the stream type selected in Step S13.

In the embodiment 6, data transmission is performed in the stream type suitable for the processing function executed by the client. Accordingly, image display in the client can be performed at high speed, or, printing, storage, or updating can be performed with a reduced memory.

An embodiment 7 is described.

The present invention is not limited to the above-described embodiments. The respective functions described above may be embodied in a form of a program, respectively, which program may be previously written in a recording medium, the program thus recorded in the recording medium may be stored in a memory or a storage device of a computer, the program may be executed, and thus, the object of the program can be achieved. In this case, the program itself read out from the recording medium achieves the functions of the above-described embodiments, and the program and the recording medium storing the same are also included in the scope of the present invention Further, the above-mentioned program may be one, such that, based on instructions of the program, in cooperation with an operating system or another application program, processing is executed, and thus, the functions of the above-described embodiments are executed.

Further, program code read from the recording medium may be written in a function expansion card inserted in the computer, or a memory included in a function expanding unit connected to the computer, then, based on instructions of the program code, a CPU of the function expansion card or the function expansion unit or such, may perform all or part of the actual processing, and thus, by this processing, the functions of the above-described embodiments can be achieved.

The program achieving the functions of the above-described embodiments may be provided in a recording medium in any form such as a disk (for example, a magnetic disk, an optical disk or such), a card (for example, a memory card, an optical card or such), a semiconductor memory (for example, a ROM, a nonvolatile memory or such, a tape (for example, a magnetic tape, a cassette tape, or such). Alternatively, via the network, the program may be directly provided from a storage device of a server computer. In this case the storage device of the server computer may also be included in the scope of the present invention.

By distributing the functions of the above-described embodiments in the form of the program, cost reduction, portability, and versatility can be improved.

Further, the present invention is not limited to the above-described embodiments, and variations and modifications may be made without departing from the basic concept of the present invention claimed below.

What is claimed is:

1. An image processing system, in which code data is transmitted between at least one client and a server, wherein:
the client comprises:
a selecting unit to select a processing function to execute; and
a notifying unit to notify of the selected processing function to the server; and
the server comprises:
a selecting unit to select a type of a stream of code data transmitted between the server and the client, based on the notified processing function; and a notifying unit to notify the client of the selected type of stream wherein the code data transmitted between the client and the server comprises data conforming to JPEG2000; and the server comprises a transforming unit to transform code data of a single layer into the code data of multi-layers when the code data to transmit to the client is one of the single layer.

2. The image processing system as claimed in claim 1, wherein:

the selecting unit of the server selects JPP-stream as the type of stream when the processing function notified by the client is displaying.

3. The image processing system as claimed in claim 1, wherein:

the selecting unit of the server selects JPT-stream as the type of stream when the processing function notified by the client is printing, storing or uploading.

4. The image processing system as claimed in claim 1, wherein:

the server comprises a transforming unit to transform code data of multi-layers into the code data of a single-layer when the code data to transmit to the client is one of the multi-layers.

5. The image processing system as claimed in claim 1, wherein:

the notifying unit of the client to notify the server also of an image quality designation when the selected processing function is displaying; and the server comprises a partial code selecting unit to select a partial code corresponding to the image quality of the code data to transmit to the client, when the client specifies the image quality.

6. An image processing system, in which code data is transmitted between at least one client and a server, wherein:

the client comprises:

a selecting unit to select a processing function to execute; and a notifying unit to notify the server of the selected processing function, and a type of stream for when it is transmitted between the client and the server; and the server comprises:

a selecting unit to determine, based on the notified processing function, whether or not a type of stream notified of by the client should be changed, and, to select the notified type of stream when determining that change is not required, but select another type of stream based on the notified processing function when determining that change is required; and a notifying unit to notify the client of the selected type of stream.

7. The image processing system as claimed in claim 6, wherein:

the code data transmitted between the client and the server comprises data conforming to JPEG2000; and the selecting unit of the server determining that change is required when displaying is notified of as the processing function and JPT-stream is notified of as the type of stream, and selecting JPP-stream as the type of stream.

8. The image processing system as claimed in claim 6, wherein:

the code data transmitted between the client and the server comprises data conforming to JPEG2000; and the selecting unit of the server determining that change is required when printing, storing or uploading is notified of as the processing function and JPP-stream is notified of as the type of stream, and selecting JPT-stream as the type of stream.

9. The image processing system as claimed in claim 6, wherein:

the code data transmitted between the client and the server comprises data conforming to JPEG2000; and the server comprises a transforming unit to transform code data of a single layer into the code data of multi-layers when the code data to transmit to the client is one of the single layer.

10. The image processing system as claimed in claim 6, wherein:

the code data transmitted between the client and the server comprises data conforming to JPEG2000; and the server comprises a transforming unit to transform code data of multi-layers into the code data of a single-layer when the code data to transmit to the client is one of the multi-layers.

11. The image processing system as claimed in claim 6, wherein:

the code data transmitted between the client and the server comprises data conforming to JPEG2000;

the notifying unit of the client to notify the server also of a image quality designation when the selected processing function is displaying; and the server comprises a partial code selecting unit to select a partial code corresponding to the image quality of the code data to transmit to the client, when the client specifies image quality.

12. An image processing method concerning transmission of code data between at least one client and a server, comprising:

the client selecting a processing function to execute;

notifying the server of the selected processing function;

the server selecting a type of a stream of code data transmitted between the server and the client, based on the notified processing function; and notifying the client of the selected type of stream wherein:

the code data transmitted between the client and the server comprises data conforming to JPEG2000; and the server transforming code data of a single layer into the code data of multi-layers when the code data to transmit to the client is one of the single layer.

13. The image processing method as claimed in claim 12, wherein:

the server selecting the type comprises the server selecting a JPP-stream as the type of stream when the processing function specified of by the client is displaying.

14. The image processing method as claimed in claim 12, wherein:

the server selecting the type comprises the server selecting a JPT-stream as the type of stream when the processing function specified by the client is printing, storing or uploading.

15. The image processing method as claimed in claim 12, wherein:

the method further comprises the server transforming code data of multi-layers into the code data of a single layer when the code data to transmit to the client is one of the multi-layers.

16. The image processing methods as claimed in claim 12, wherein:

the client notifying comprises notifying the server also of an image quality designation when the selected processing function is displaying; and the method further comprises the server selecting a partial code corresponding to the image quality of the code data to transmit to the client, when the server has been notified of image quality by the client.

17. An image processing method, in which code data is transmitted between at least one client and a server, comprising:
   a client of the at least one client selecting a processing function to execute;
   notifying the server of the selected processing function, and a type of stream for transmission between the client and the server; and
   the server determining, based on the notified processing function, whether or not a type of stream of which the client notified the server should be changed, and, selecting the notified type of stream when determining that change is not required, but selecting another type of stream based on the notified processing function when determining that change is required; and
   notifying the client of the selected type of stream.

18. The image processing method as claimed in claim 17, wherein:
   the code data transmitted between the client and the server comprises data conforming to JPEG2000; and
   the server selecting the notified type of the stream comprises determining that change is required when displaying is specified as the processing function and JPT-stream is specified as the type of stream, and selecting JPP-stream as the type of stream.

19. The image processing method as claimed in claim 17, wherein:
   the code data transmitted between the client and the server comprises data conforming to JPEG2000; and
   the server selecting the notified type of the stream comprises determining that change is required when printing, storing or uploading is specified as the processing function and JPP-stream is specified as the type of stream, and selecting JPT-stream as the type of stream.

20. The image processing method as claimed in claim 17, wherein:
   the code data transmitted between the client and the server comprises data conforming to JPEG2000; and
   the method further comprise the server transforming code data of a single layer into the code data of multi-layers when the code data to transmit to the client is one of the single layer.

21. The image processing method as claimed in claim 17, wherein:
   the code data transmitted between the client and the server comprises data conforming to JPEG2000; and
   the method further comprises the server transforming code data of multi-layers into the code data of a single layer when the code data to transmit to the client is one of the multi-layers.

22. The image processing method as claimed in claim 17, wherein:
   the code data transmitted between the client and the server comprises data conforming to JPEG2000;
   the client notifying comprises notifying the server also of an image quality designation when the selected processing function is displaying; and
   the method further comprises the server selecting a partial code corresponding to the image quality of the code data to transmit to the client, when the server has been notified of image quality by the client.

23. A computer readable information recording medium storing a program for causing a computer for controlling transmission of code data between at least one client and a server to execute the method comprising:
   the client selecting a processing function to execute;
   notifying of the selected processing function to the server;
   the server selecting a type of a stream of code data transmitted between the server and the client, based on the notified processing function; and
   notifying of the selected type of stream to the client wherein:
   the code data transmitted between the client and the server comprises data conforming to JPEG2000; and
   transforming code data of a single layer into the code data of multi-layers when the code data to transmit to the client is one of the single layer.

24. The computer readable information recording medium as claimed in claim 23, wherein:
   the code data transmitted between the client and the server comprises data conforming to JPEG2000; and
   the server selecting the type comprises the server selecting a JPP-stream as the type of stream when the processing function specified of by the client is displaying.

25. The computer readable information recording medium as claimed in claim 23, wherein:
   the code data transmitted between the client and the server comprises data conforming to JPEG2000; and
   the server selecting the type comprises the server selecting a JPT-stream as the type of stream when the processing function specified of by the client is printing, storing or uploading.

26. The computer readable information recording medium as claimed in claim 23, wherein:
   the program further comprises instructions to cause the computer to execute the operation of the server transforming code data of multi-layers into the code data of a single layer when the code data to transmit to the client is one of the multi-layers.

27. The computer readable information recording medium as claimed in claim 23, wherein:
   the client notifying comprises notifying the server also of an image quality designation when the selected processing function is displaying; and
   the program further comprises instructions to cause the computer to execute the operation of the server selecting a partial code corresponding to the image quality of the code data to transmit to the client, when having the client specify the image quality.

28. A computer readable information recording medium storing a program for causing a computer for controlling transmission of code data between at least one client and a server, to execute the method comprising:
   the client selecting a processing function to execute; and
   notifying the server of the selected processing function, and a type of stream to be transmitted between the client and the server; and
   the server determining, based on the notified processing function, whether or not a type of stream transmitted from the client should be changed, and, selecting the notified type of stream when determining that change is not required, but selecting another type of stream based on the notified processing function when determining that change is required; and
   notifying the client of the selected type of stream.

29. The computer readable information recording medium as claimed in claim 28, wherein:
   the code data transmitted between the client and the server comprises data conforming to JPEG2000; and the server selecting comprises determining that a change is required when displaying is specified of as the processing function and JPT-stream is notified of as the type of stream, and selecting JPP-stream as the type of stream.

30. The computer readable information recording medium as claimed in claim 28, wherein:
the code data transmitted between the client and the server comprises data conforming to JPEG2000; and
the server selecting comprises determining that a change is required when printing, storing or uploading is specified as the processing function and JPP-stream is notified as the type of stream, and selecting JPT-stream as the type of stream.

31. The computer readable information recording medium as claimed in claim 28, wherein:
the code data transmitted between the client and the server comprises data conforming to JPEG2000; and
the program further comprises instructions to cause the computer to execute the operation of the server transforming code data of a single layer into the code data of multi-layers when the code data to transmit to the client is one of the single layer.

32. The computer readable information recording medium as claimed in claim 28, wherein:
the code data transmitted between the client and the server comprises data conforming to JPEG2000; and
the program further comprises instructions to cause the computer to execute the operation of the server transforming code data of multi-layers into the code data of a single layer when the code data to transmit to the client is one of the multi-layers.

33. The computer readable information recording medium as claimed in claim 28, wherein:
the code data transmitted between the client and the server comprises data conforming to JPEG2000;
the client notifying comprises notifying the server also of an image quality designation when the selected processing function is displaying; and
the program further comprises instructions to cause the computer to execute the operation of the server selecting a partial code corresponding to the image quality of the code data to transmit to the client, when having the client specify the image quality.

* * * * *